US011151058B2

(12) United States Patent
Gupta et al.

(10) Patent No.: US 11,151,058 B2
(45) Date of Patent: Oct. 19, 2021

(54) ADAPTIVE CACHING IN A MULTI-TIER CACHE

(71) Applicant: INTERNATIONAL BUSINESS MACHINES CORPORATION, Armonk, NY (US)

(72) Inventors: Lokesh Mohan Gupta, Tucson, AZ (US); Kyler A. Anderson, Sahuarita, AZ (US); Kevin J. Ash, Tucson, AZ (US); Matthew G. Borlick, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/748,656

(22) Filed: Jan. 21, 2020

(65) Prior Publication Data

US 2021/0224200 A1 Jul. 22, 2021

(51) Int. Cl.
*G06F 12/126* (2016.01)
*G06F 12/0862* (2016.01)
*G06F 12/0897* (2016.01)

(52) U.S. Cl.
CPC ........ *G06F 12/126* (2013.01); *G06F 12/0862* (2013.01); *G06F 12/0897* (2013.01); *G06F 2212/6012* (2013.01)

(58) Field of Classification Search
CPC .................................................. G06F 12/126
USPC ......................................................... 711/122
See application file for complete search history.

(56) References Cited

U.S. PATENT DOCUMENTS

| 9,069,678 | B2 | 6/2015 | Benhase et al. | |
| 9,069,679 | B2 | 6/2015 | Benhase et al. | |
| 9,286,079 | B1* | 3/2016 | Roden | G06F 9/4401 |
| 9,477,607 | B2 | 10/2016 | Benhase et al. | |
| 9,811,276 | B1 | 11/2017 | Taylor et al. | |
| 10,210,084 | B1 | 2/2019 | Bruce et al. | |
| 10,241,912 | B2 | 3/2019 | Ramanujan et al. | |
| 2003/0033483 | A1* | 2/2003 | O'Connor | G06F 12/0897 |
| | | | | 711/122 |

* cited by examiner

*Primary Examiner* — Jae U Yu
(74) *Attorney, Agent, or Firm* — Konrad Raynes Davda & Victor LLP

(57) ABSTRACT

Provided are a computer program product, system, and method for staging data from storage to a fast cache tier of a multi-tier cache in a non-adaptive sector caching mode in which data staged in response to a read request is limited to track sectors required to satisfy the read request. Data is also staged from storage to a slow cache tier of the multi-tier cache in a selected adaptive caching mode of a plurality of adaptive caching modes available for staging data of tracks. Adaptive caching modes are selected for the slow cache tier as a function of historical access ratios. Prestage requests for the slow cache tier are enqueued in one of a plurality of prestage request queues of various priority levels as a function of the selected adaptive caching mode and historical access ratios. Other aspects and advantages are provided, depending upon the particular application.

21 Claims, 9 Drawing Sheets

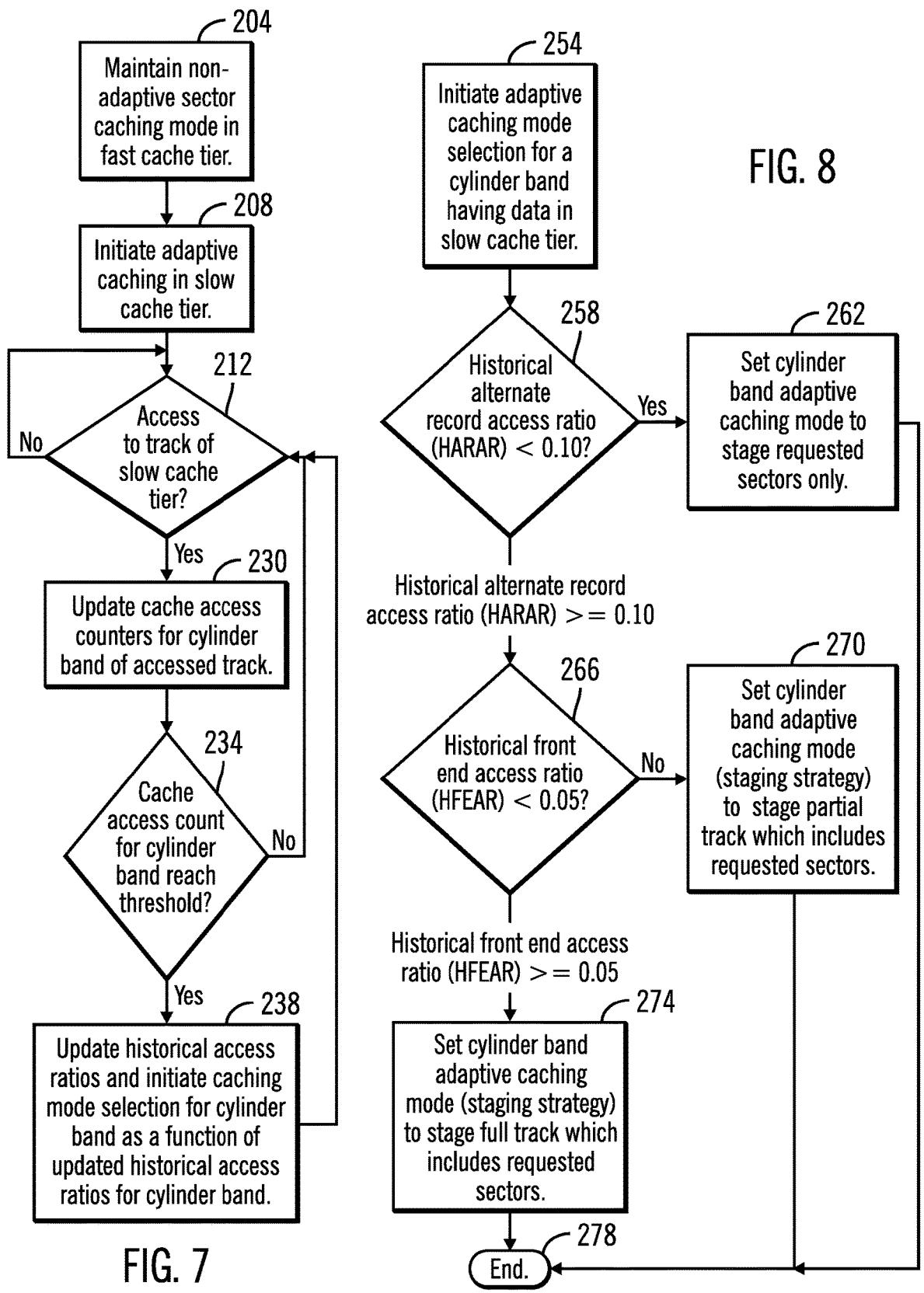

ADAPTIVE CACHING IN A MULTI-TIER CACHE

BACKGROUND OF THE INVENTION

1. Field of the Invention

The present invention relates to a computer program product, system, and method for adaptive caching in a multi-tier cache.

2. Description of the Related Art

A storage system typically includes a storage controller and one or more data storage units or devices (often referred to simply as "storage") such as hard disk drives, solid state drives, tape drives, etc. The storage system is often connected to a host with hosts applications which issue input/output instructions or commands for writing data to or reading data from a storage subunit such as a track or volume, for example.

Data storage systems, particularly at the enterprise level, are usually designed to provide a high level of redundancy to reduce the risk of data loss in the event of failure of a component of the data storage system. Thus, multiple copies of data are frequently stored on multiple systems which may be geographically dispersed. Data from a host to be stored in the data storage system is typically directed to a primary data storage device at a local site and then replicated to one or more secondary data storage devices which may be geographically remote from the primary data storage device.

A cache is a memory which typically provides faster access to data for input/output operations as compared to storage. Data to be read may be first staged into the cache from storage and then read directly from the cache instead of directly from the storage to provide faster access to read data. Conversely, data to be updated may be first updated in the cache and then destaged to storage which is typically non-volatile storage, that is, the data persists in the non-volatile storage notwithstanding a loss of power to the storage. By comparison, some or all of the cache memory may be volatile memory, that is, data may not persist in a volatile cache in the event of a power failure.

Data stored in storage may be subdivided into various subunits of data. For example, one known subunit of data is a track which in turn comprises a string of smaller, contiguous subunits of data referred to as sectors of data in which adjacent sectors of the track are stored in contiguous physical locations. In general, contiguous sectors of data may be more efficiently staged from storage into cache as compared to non-contiguous sectors.

A larger subunit of data is a cylinder which includes a set of contiguous tracks stored in contiguous physical locations. A still larger subunit of data is referred to as a band of cylinders which includes a set of contiguous cylinders stored in contiguous physical locations.

Data requested in a data request which is not present in the cache, may be staged from storage to the cache. A caching operation in which data which has not been specifically requested may be staged from storage to the cache in what is often referred to as "prestaging" in anticipation of a subsequent request for the prestaged data.

One known cache management technique for managing the limited memory space of a cache, referred to as Adaptive Caching Control Block (ACCB), adaptively selects one of three different adaptive caching modes as a function of historical access ratios, that is, a Historical front end access ratio (HFEAR) and a historical alternate record access ratio (HARAR). The three adaptive caching modes of ACCB are as follows:

Sector adaptive caching mode (also known as Record mode Staging/Caching)—In the sector adaptive caching mode, only the sector or sectors required to satisfy a current request are staged into the cache.

Partial Track adaptive caching mode—In partial track adaptive caching mode, only a portion of the track beginning at the initial point of access of the track for the current request, to the end of track, is staged into cache. Thus in partial track adaptive caching, not only the sectors of the current request are staged to cache, but also the sectors within the same track which follow the currently requested sectors to the end of the track, are prestaged to cache in anticipation of a future request.

Full Track adaptive caching mode—In full track adaptive caching mode, irrespective of access point on the track for the current request, the entire track is staged into cache. Thus in full track adaptive caching, not only the sectors of the current request are staged to cache, but also all the other sectors within the same track, are prestaged to cache in anticipation of a future request.

The historical access ratios, HFEAR and HARAR, provide statistical characterizations of patterns of cache access for a particular band of 126 cylinders of storage. Thus, a historical front end access ratio (HFEAR) and a historical alternate record access ratio (HARAR) are computed for each band of cylinders and stored in an ACCB data structure for the associated band of cylinders. These historical access ratios are updated after 128 accesses to the particular band of cylinders. After each update for a particular band of cylinders, the adaptive caching mode previously selected for the particular band of cylinders, may be dynamically changed to a different adaptive caching mode for that band of cylinders, based upon the updated historical access ratios computed for that band of cylinders.

In order to determine which adaptive caching mode to use for a particular request requesting access to one or more sectors of one or more tracks, the following statistics are maintained by counters for each cylinder band, as follows:

Miss Counter—A miss counter is incremented if the requested sector of a track is not in cache.

Hit Counter—A hit counter is incremented if the requested sector of a track is in cache.

Front Access (FA) Counter—A front access counter is incremented if the requested track is in cache and the first sector requested by the current request precedes the sector requested by a prior request that caused the track to be promoted, that is, staged into cache.

Back Access (BA) Counter—A back access counter is incremented if the requested track is in cache and the first sector requested by the current request follows the sector requested by a prior request that caused the track to be promoted.

These counters are updated for each access to a track requested by the current request. Approximately every 128 accesses to a cylinder band, the historical ratios, HFEAR and HARAR, are updated and the selection of an adaptive caching mode is updated for the cylinder band based upon its updated historical access ratios. The historical access ratios are updated as follows:

new HFEAR=((FA/(Hit+Miss))+HFEAR)/2 new HARAR=(((FA+BA)/(Hit+Miss))+HARAR)/2

In a known ACCB adaptive caching technique, the sector adaptive caching mode is selected to stage requested sectors only if HARAR is less than 0.10. The partial track adaptive caching mode is selected if HARAR is greater than or equal to 0.10 and HFEAR is less than 0.05. The full track adaptive caching mode is selected if HARAR is greater than 0.10 and HFEAR is greater than or equal to 0.05. The selected adaptive caching mode is dynamically changed as the historical access ratios are updated, to make more effective use of the limited space of the cache.

A storage class memory (SCM) system utilizes low latency Dynamic Random Access Memory (DRAM) and one or more higher latency flash NAND memory devices, which may be less expensive than DRAM, to potentially provide greater storage in the memory or cache at a lower cost by using higher latency, lower cost NAND devices. SCM allows system memory to be expanded with non-volatile memory NAND devices.

Flash memory devices typically have less endurance than DRAM as there are typically a limited number of erase cycles for flash bit cells, usually far less so than for DRAM cells. One known technique to reduce wear on the flash memory devices is to use wear leveling techniques that distribute writes across multiple flash memory cells in the same or different device to avoid overuse of specific flash memory cells.

Another problem with flash based devices is often referred to as "garbage collection." Flash based devices typically reclaim memory which has been written to by erasing memory a block at a time so that new data may be written to the erased block. However, an erased block includes many pages of memory whereas writes to flash are typically done in pages. Since reclaiming is done at the level of erase blocks instead of at the page level at which writes occur, flash memory can become fragmented, increasing the need for processor intensive garbage collection operations.

SUMMARY

Adaptive caching in a multi-tier cache in a data storage system in accordance with the present description provides a significant improvement in computer technology. In one embodiment, data is staged to a fast cache tier of a multi-tier cache in a non-adaptive sector caching mode in which data staged in response to a read request is limited to track sectors required to satisfy the read request. By limiting the staging of data in the fast cache tier to a sector caching mode, the number of tracks having data cached in the fast cache tier may be increased, notwithstanding that the fast cache tier may be relatively small in capacity.

By comparison, data is staged to a slow cache tier of the multi-tier cache in a selected adaptive caching mode of a plurality of adaptive caching modes available for staging data of tracks. In those embodiments in which the slow cache tier is substantially larger in capacity as compared to the fast cache tier, it is appreciated that various adaptive caching modes such as full track and partial track adaptive caching modes, for example, may be more readily accommodated in the slow cache tier as compared to a smaller fast cache tier. For example, an increased size of the slow cache tier can reduce an adverse impact of an increase in the quantity of data being staged into the slow cache tier for each track as a result of full track and partial track adaptive caching modes. As a result, the quantity of data cached in the slow cache tier for each track may be increased to improve cache hit rates as a result of full track and partial track adaptive caching modes while the number of tracks having data cached in the slow cache tier may be maintained at relatively high levels as compared to full track and partial track adaptive caching modes in known smaller DRAM type only caches.

In one embodiment, the plurality of adaptive caching modes includes a sector adaptive caching mode in which data staged to the slow cache tier in response to a read request identifying at least one sector of a track, is limited in the sector adaptive caching mode to track sectors identified by the read request, a partial track adaptive caching mode in which data staged to the slow cache tier in response to a read request identifying sectors starting at an initial point of access of a track, is limited in the adaptive caching partial track mode, to a portion of a track beginning at the initial point of access of the track for the read request, to the end of track, and a full track adaptive caching mode in which data staged to the slow cache tier in response to a read request identifying sectors starting at an initial point of access of a track, is an entire track irrespective of the initial point of access of the track for the read request.

In another aspect of multi-tier adaptive caching of the present description, historical access ratios for a set of tracks are determined, and an adaptive caching mode of the plurality of adaptive caching modes available for staging data of the set of tracks to the slow cache tier, is selected for the set of tracks as a function of historical access ratios determined for the set of tracks. Accordingly, the selection of an adaptive caching mode for the slow cache tier may change as access patterns change as evidenced by calculated historical access ratios. It is appreciated that in some embodiments, a non-adaptive caching mode may be applied to the slow cache tier.

In yet another aspect of multi-tier adaptive caching of the present description, prestage requests are queued in one of a plurality of prestage request queues as a function of the selected adaptive caching mode and as a function of historical access ratios determined for the set of tracks. In one embodiment, the plurality of prestage request queues includes a first prestage request queue for queuing prestage requests having a first priority, a second prestage request queue for queuing prestage requests having a second priority lower than the first priority, and a third prestage request queue for queuing prestage requests having a third priority lower than the second priority. In embodiments in which the slow cache tier has a relatively large memory capacity, prestaging lower priority tracks need not crowd out higher priority tracks. As a result, hit ratios may be improved in the slow cache tier by queueing lower priority prestage requests as well as higher priority prestage requests.

In still another aspect of multi-tier adaptive caching of the present description, tasks for execution of prestage requests queued on the first, second and third prestage request queues are allocated as a function of available storage drive access bandwidth for prestaging tracks stored in the storage to the slow cache tier. Thus, the greater the availability of storage drive access bandwidth, the greater the number of tasks which are allocated for execution of prestage requests queued on the prestage request queues. As a result, prestaging may be increased to increase hit ratios in the slow cache tier in those intervals of greater availability of drive access bandwidth.

In another aspect of multi-tier adaptive caching of the present description, allocated tasks are dispatched to execute prestage requests queued on selected prestage request queues of the first, second and third prestage request queues as a function of the first, second and third priority associated with first, second and third prestage request queues, respectively. In one embodiment, allocated task dispatching includes dispatching allocated tasks as a function of first, second and third limits associated with the first, second and third prestage request queues. For example, the first limit associated with the first prestage request queue having the first priority may be higher than the second limit associated with the second prestage request queue having the second priority and the second limit associated with the second prestage request queue having the second priority may be higher than the third limit associated with the third prestage request queue having the third priority. In this manner, the higher priority of the prestage request queue, the more frequently prestage requests queued on the particular queue are executed with a dispatched task.

Accordingly, adaptive caching in a multi-tier cache in accordance with the present description, may improve the efficiency of the computer system including increasing hit ratios in an extended cache having multiple tiers. Other aspects and advantages may be realized, depending upon the particular application.

BRIEF DESCRIPTION OF THE DRAWINGS

FIG. 7 illustrates an example of operations of components of the computing environment of FIG. 1 employing adaptive caching in accordance with one aspect of the present description, including operations of computing updates of historical access ratio statistics for a cylinder band of tracks having data cached in a slow cache tier of a multi-tier cache.

FIG. 8 illustrates another example of operations of components of the computing environment of FIG. 1, including operations of dynamically selecting an adaptive caching mode for a slow cache tier of a multi-tier cache employing adaptive caching in accordance with one aspect of the present description.

DETAILED DESCRIPTION

Figure 1:
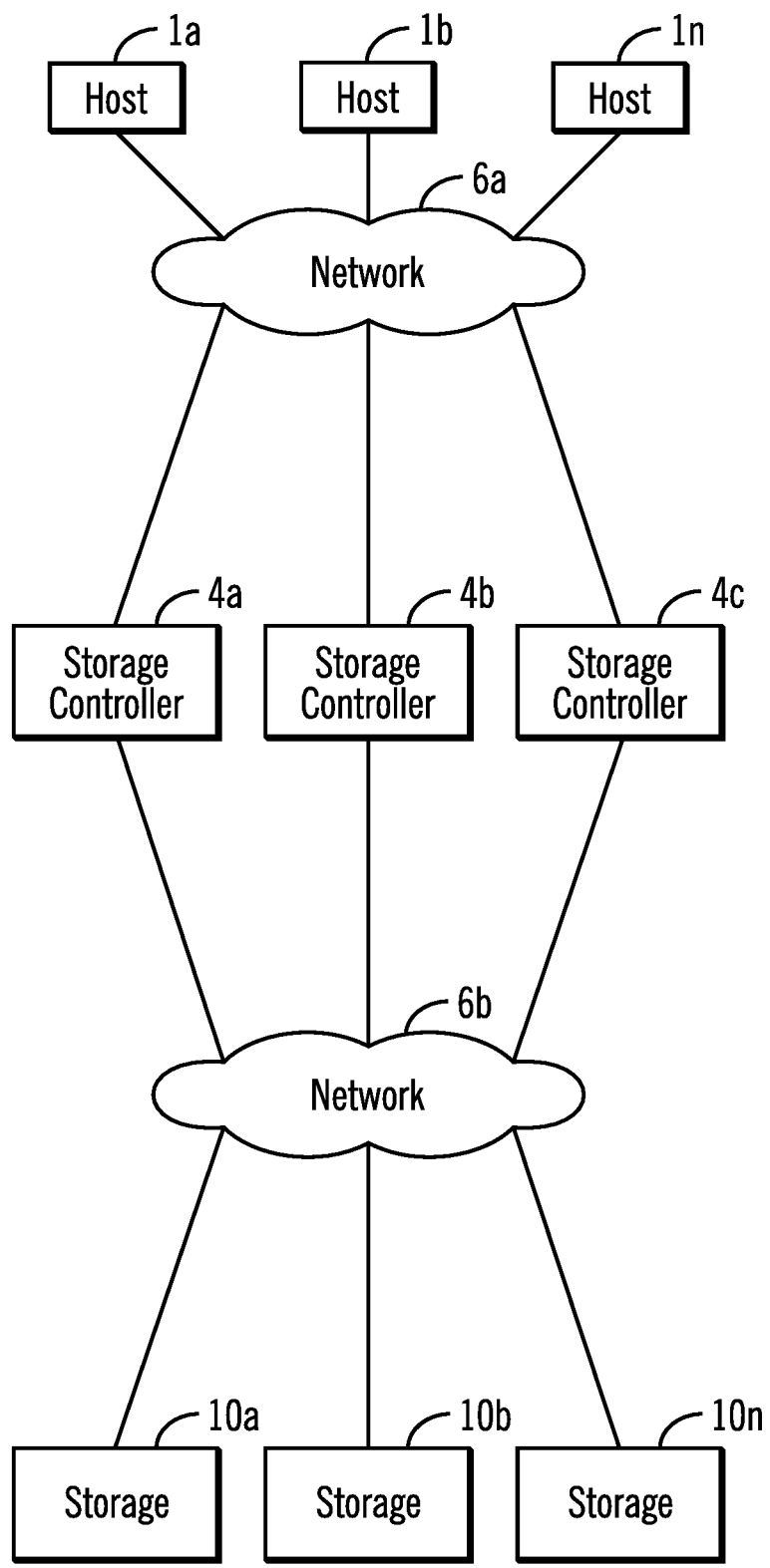
FIG. 1 illustrates an embodiment of a computing environment employing adaptive caching in a multi-tier cache in a data storage system in accordance with one aspect of the present description.

It is appreciated herein that in known full track and partial track adaptive caching modes, more data per track of a cylinder band is typically cached as compared to the sector adaptive caching mode. As a result, full track and partial track adaptive caching modes can improve the overall rate of successful hits to cache in response to data requests directed to tracks of a cylinder band, due to the greater amount of data per track in the cache for that cylinder band.

On the other hand, due to the limited space of the cache, full track and partial track adaptive caching mode can result in data for fewer tracks being in cache for the cylinder band as compared to the number of tracks for which data is in cache when the sector adaptive caching mode is in use for the cylinder band. As a result, if the full or partial tracks in cache are not getting many hits for the cylinder band, the read hit ratio may be lower in a full track or partial track adaptive caching mode as compared to a sector adaptive caching mode for the cylinder band.

It is further appreciated herein that full track and partial track adaptive caching modes tend to utilize more drive access bandwidth (also referred to as "backend bandwidth") since these modes typically transfer more data from storage as compared to the sector adaptive caching mode. Thus, other processes accessing storage may be more likely to have reduced access to storage as compared to when sector adaptive caching mode is in use.

Adaptive caching in a multi-tier cache in a data storage system in accordance with the present description can provide a significant improvement in computer technology. For example, in one aspect of multi-tier cache staging in accordance with the present description, staging of data to a fast cache tier such as a DRAM type tier of a multi-tier cache is maintained by multi-tier adaptive caching logic in a non-adaptive sector caching mode in which data staged in response to a read request is limited to track sectors required to satisfy the read request. By limiting the staging of data in the fast cache tier to a sector caching mode, the number of tracks having data cached in the fast cache tier may be increased, notwithstanding that the fast cache tier may be relatively small in capacity. In one embodiment, staging in the fast cache tier remains in the non-adaptive sector caching mode and does not switch to other modes such as partial track caching or full track caching modes even though conditions such as historical access ratios may change. As a result, the number of tracks having data cached in the fast cache tier may be increased for a given size of the fast cache tier, as compared to other caching modes. It is appreciated that in other embodiments, other caching modes may be applied to the fast cache tier.

By comparison, in another aspect of multi-tier cache staging of the present description, the multi-tier adaptive caching logic stages data to a slow cache tier such as a NAND type memory, for example, of the multi-tier cache in a dynamically selected adaptive caching mode selected as a function of historical access statistics such as historical access ratios, for example. As a NAND type memory, the slow cache tier may be substantially larger in capacity as compared to the fast cache tier in many embodiments. As used herein, the term "staging" may include prestaging, depending upon the context.

In one embodiment, multiple available adaptive caching modes from which a caching mode may be dynamically selected for the slow cache tier include a sector adaptive caching mode in which data staged to the slow cache tier in response to a read request identifying at least one sector of a track, is limited in the sector adaptive caching mode to track sectors identified by the read request. Available adaptive caching modes further include a partial track adaptive caching mode in which data staged to the slow cache tier in response to a read request identifying sectors starting at an initial point of access of a track, is limited in the partial track adaptive caching mode, to a portion of a track beginning at the initial point of access of the track for the read request, to the end of track. Another available adaptive caching mode from which a caching mode may be selected in adaptive caching for the slow cache tier, is a full track adaptive caching mode in which data staged to the slow cache tier in response to a read request identifying sectors starting at an initial point of access of a track, is the entire track irrespective of the initial point of access of the track for the read request.

In those embodiments in which the slow cache tier is substantially larger in capacity as compared to the fast cache tier, it is appreciated that full track and partial track adaptive caching modes may be more readily accommodated in the slow cache tier as compared to a smaller fast cache tier. For example, an increased size of the slow cache tier can reduce an adverse impact of an increase in the quantity of data being staged into the slow cache tier for each track as a result of full track and partial track adaptive caching modes. As a result, the quantity of data cached in the slow cache tier for each track may be increased to improve cache hit rates as a result of full track and partial track adaptive caching modes while the number of tracks having data cached in the slow cache tier may be maintained at relatively high levels as compared to full track and partial track adaptive caching modes in known smaller DRAM type only caches.

Accordingly, an increase in the quantity of data being staged into the slow cache tier for each track as a result of full track and partial track adaptive caching modes, is less likely to crowd out other data which is likely to receive hits if it remains in the slow cache tier. As a result, full track and partial track adaptive caching modes can improve the overall rate of successful hits to cache in response to data requests directed to tracks of a cylinder band, due to the greater amount of data per track in the cache for that cylinder band. Furthermore, the number of tracks having data cached in the slow cache tier may be increased due to the larger size of the slow cache tier as compared to a typical DRAM type only cache.

Furthermore, in another aspect of multi-tier adaptive caching of the present description, the adaptive caching of the slow cache tier can switch to sector adaptive caching mode as conditions warrant. For example, if the full or partial tracks in cache are not getting many hits for the cylinder band, the read hit ratio may be lower in a full track or partial track adaptive caching mode as compared to a sector adaptive caching mode for the cylinder band. Accordingly, it may be appropriate to switch to the sector adaptive caching mode for the slow cache tier.

In yet another aspect of the present description, prestaging requests for the slow cache tier may be assigned varying levels of priority as a function of the adaptive caching mode selected for the slow cache tier, and also as a function of the levels of historical access ratios computed for each cylinder band of tracks for the slow cache tier. For example, the historical alternate record access ratio (HARAR) is updated periodically for each cylinder band of tracks as a running average of the computed HARAR values, and provides an indication of the historical proportion of front accesses (FA) and back accesses (BAs) to the total number of accesses (hits plus misses) for the particular cylinder band. The higher the historical alternate record access ratio (HARAR) level, the greater the historical proportion of front accesses (FAs) and back accesses (BAs) to the total number of accesses (hits plus misses) for the cylinder band, and the greater the likelihood that caching a partial track will lead to an increase in cache hits as compared to requests in an interval having a lower historical alternate record access ratio (HARAR) level.

In one embodiment, in an interval in which the last updated value of the historical alternate record access ratio (HARAR) is at a relatively high level, a request to prestage a partial track in the partial track adaptive caching mode in that interval, is deemed a relatively high priority prestage request and is enqueued on a high priority prestage request queue to await execution. Alternatively, in an interval in which the last updated value of the historical alternate record access ratio (HARAR) is at a relatively intermediate level, a request to prestage a partial track in the partial track adaptive caching mode in that interval, is deemed a relatively intermediate priority prestage request and is enqueued on an intermediate priority prestage request queue to await execution. Still further, in an interval in which the last updated value of the historical alternate record access ratio (HARAR) is at a relatively low level, a request to prestage a partial track in the partial track adaptive caching mode in that interval, is deemed a relatively low priority prestage request and is enqueued on a low priority prestage request queue to await execution. In this manner, the greater the historical proportion of front accesses (FA) and back accesses to the total number of accesses (hits plus misses) for the cylinder band, the higher the priority assigned a prestage request for a partial track in the partial track adaptive caching mode.

As another example, the historical front end access ratio (HFEAR) is also updated periodically for each cylinder band of tracks as a running average of the computed HFEAR values, and provides an indication of the historical proportion of front accesses (FA) to the total number of accesses (hits plus misses) for the particular cylinder band. The higher the historical front end access ratio (HFEAR) level, the greater the historical proportion of front accesses (FA) to the total number of accesses (hits plus misses) for the cylinder band.

In one embodiment, in an interval in which the sum of the last updated value of the historical alternate record access ratio (HARAR) and the last updated value of the historical front end access ratio (HFEAR) is at a relatively high level, a request to prestage a full track in the full track adaptive caching mode in that interval, is deemed a relatively high priority prestage request and is enqueued on a high priority prestage request queue to await execution. Alternatively, in an interval in which the sum of the last updated value of the historical alternate record access ratio (HARAR) and the last updated value of the historical alternate record access ratio (HARAR) is at a relatively intermediate level, a request to prestage a full track in the full track adaptive caching mode in that interval, is deemed a relatively intermediate priority prestage request and is enqueued on an intermediate priority prestage request queue to await execution. Still further, in an interval in which the sum of the last updated value of the historical alternate record access ratio (HARAR) and the last updated value of the historical alternate record access ratio (HARAR) is at a relatively low level, a request to prestage a full track in the full track adaptive caching mode in that interval, is deemed a relatively low priority prestage request and is enqueued on a low priority prestage request queue to await execution. In this manner, the greater the combined historical proportion of front accesses (FA) and back accesses to the total number of accesses (hits plus misses) for the cylinder band and the historical proportion of front accesses (FA) alone to the total number of accesses (hits plus misses) for the cylinder band, the higher the priority assigned a prestage request for a full track in the full track adaptive caching mode.

In yet another example, if a data request is for a full track, that is, for all sectors of a track, no prestaging is indicated because all sectors of the track have already been requested. Accordingly, enqueueing a prestage request on a prestage request queue is bypassed, and instead, the requested full track is staged into the slow cache tier without enqueueing a prestage request. Similarly, if a data request directed within a cylinder band occurs in an interval in which sector adaptive caching mode has been selected, enqueueing a prestage request on a prestage request queue is again bypassed and instead, all the requested sectors are staged into the slow cache tier without enqueueing a prestage request.

In still another aspect of multi-tier adaptive caching in accordance with the present description, multi-tier adaptive caching logic allocates tasks for executing queued prestage requests as a function of available storage drive access bandwidth for prestaging data from storage to the cache. In general the greater the availability of storage drive access bandwidth, the greater the number of tasks which are allocated for execution of prestage requests queued on the prestage request queues. It is appreciated that the number of prestage tasks allocated for execution of prestage requests may be a function of other criteria, depending upon the particular application.

In yet another aspect of multi-tier adaptive caching in accordance with the present description, multi-tier adaptive caching logic distributes dispatching of allocated tasks to the prestage request queues for executing queued prestage requests, as a function of the priority level of the prestage request queues. For example, in one embodiment, for each prestage task dispatched for the low priority prestage request queue, up to three prestage tasks may be dispatched for the medium priority prestage request queue, and up to ten tasks may be dispatched for the high priority prestage request queue. In this manner, the higher priority of the prestage request queue, the more frequently prestage requests queued on the particular queue are executed with a dispatched task. It is appreciated that the task dispatching limits imposed on individual prestage request queues as a function of queue priority, and the ratios of prestage tasks dispatches for the respective prestage request queues, may vary, depending upon the particular application.

In this manner, adaptive caching in a multi-tier cache in accordance with the present description, may improve the efficiency of the computer system including increasing hit ratios in an extended cache having multiple tiers. Other aspects and advantages may be realized, depending upon the particular application.

A system of one or more computers may be configured for adaptive caching in a multi-tier cache in accordance with the present description, by virtue of having software, firmware, hardware, or a combination of them installed on the system that in operation causes or cause the system to perform write transfer resource management in accordance with the present description. For example, one or more computer programs may be configured to perform adaptive caching in a multi-tier cache by virtue of including instructions that, when executed by data processing apparatus such as for example a storage controller processor, cause the apparatus to perform the actions.

The operations described herein are performed by logic which is configured to perform the operations either automatically or substantially automatically with little or no system operator intervention, except where indicated as being performed manually. Thus, as used herein, the term "automatic" includes both fully automatic, that is operations performed by one or more hardware or software controlled machines with no human intervention such as user inputs to a graphical user selection interface. As used herein, the term "automatic" further includes predominantly automatic, that is, most of the operations (such as greater than 50%, for example) are performed by one or more hardware or software controlled machines with no human intervention such as user inputs to a graphical user selection interface, and the remainder of the operations (less than 50%, for example) are performed manually, that is, the manual operations are performed by one or more hardware or software controlled machines with human intervention such as user inputs to a graphical user selection interface to direct the performance of the operations.

Many of the functional elements described in this specification have been labeled as "logic," in order to more particularly emphasize their implementation independence. For example, a logic element may be implemented as a hardware circuit comprising custom VLSI circuits or gate arrays, off-the-shelf semiconductors such as logic chips, transistors, or other discrete components. A logic element may also be implemented in programmable hardware devices such as field programmable gate arrays, programmable array logic, programmable logic devices or the like.

A logic element may also be implemented in software for execution by various types of processors. A logic element which includes executable code may, for instance, comprise one or more physical or logical blocks of computer instructions which may, for instance, be organized as an object, procedure, or function. Nevertheless, the executables of an identified logic element need not be physically located together, but may comprise disparate instructions stored in different locations which, when joined logically together, comprise the logic element and achieve the stated purpose for the logic element.

Indeed, executable code for a logic element may be a single instruction, or many instructions, and may even be distributed over several different code segments, among different programs, among different processors, and across several memory devices. Similarly, operational data may be identified and illustrated herein within logic elements, and may be embodied in any suitable form and organized within any suitable type of data structure. The operational data may be collected as a single data set, or may be distributed over different locations including over different storage devices.

Figure 2:
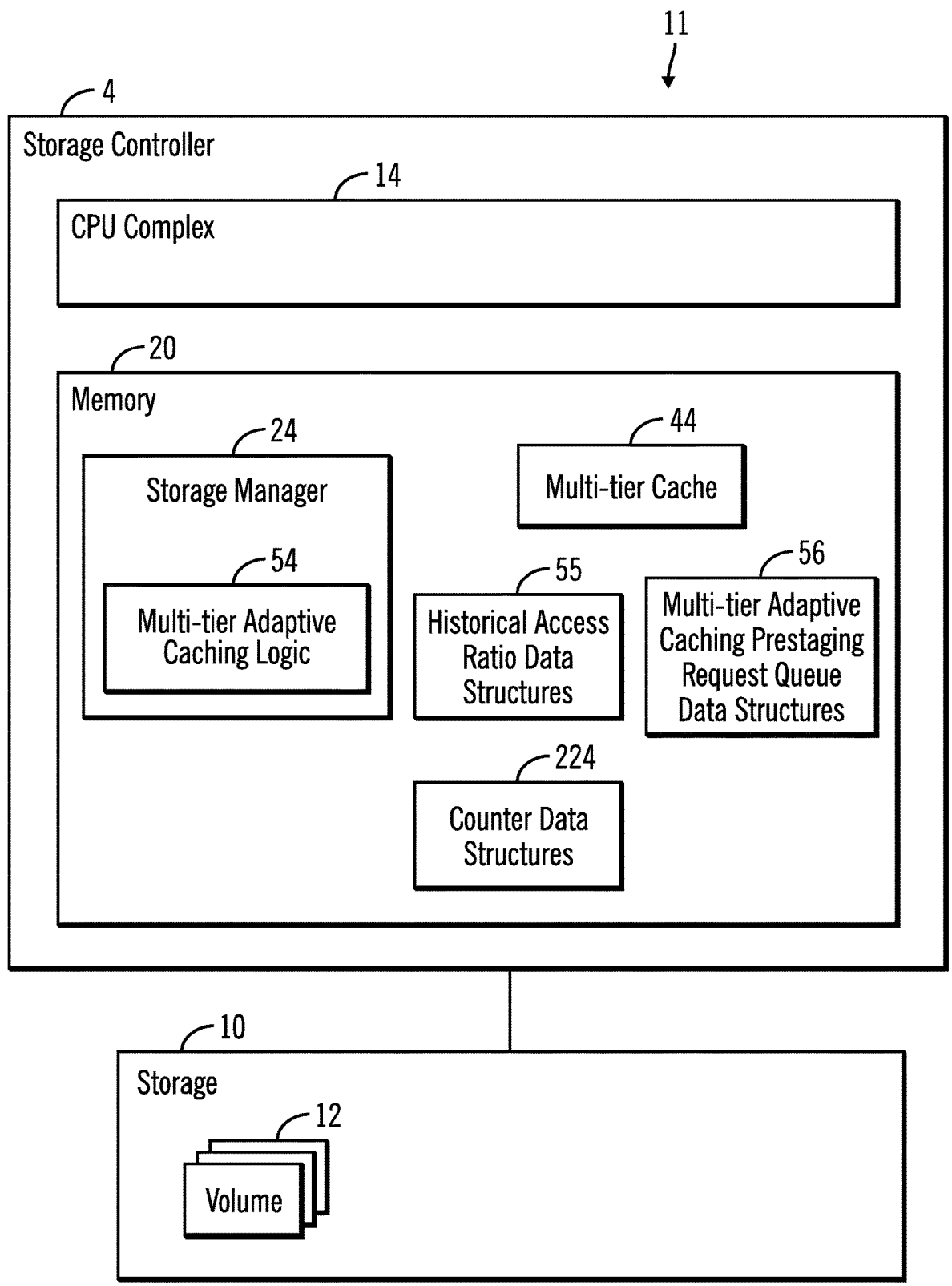
FIG. 2 illustrates an example of a data storage system including a storage controller and storage device of the computing environment of FIG. 1, employing adaptive caching in a multi-tier cache in accordance with one aspect of the present description.

FIGS. 1-6 illustrate an embodiment of a computing environment employing adaptive caching in a multi-tier cache in a data storage system in accordance with the present description. In this example, a plurality of hosts 1a, 1b . . . 1n may submit Input/Output (I/O) requests to one or more storage controllers 4a, 4b . . . 4n over a network 6a to access data stored in storage 10a, 10b . . . 10n by the storage controllers 4a, 4b . . . 4n over a network 6b. Each storage controller and the storage controlled by the storage controller over the network 6b form a data storage system 11 (FIG. 2). The hosts 1a, 1b . . . 1n may be separate physical devices or may be virtual devices implemented using assigned resources of partitions of a server, for example. In a similar manner, the storage controllers 4a, 4b . . . 4n may be separate physical devices or may be virtual devices implemented using assigned resources of partitions one or more servers, for example.

Figure 3:
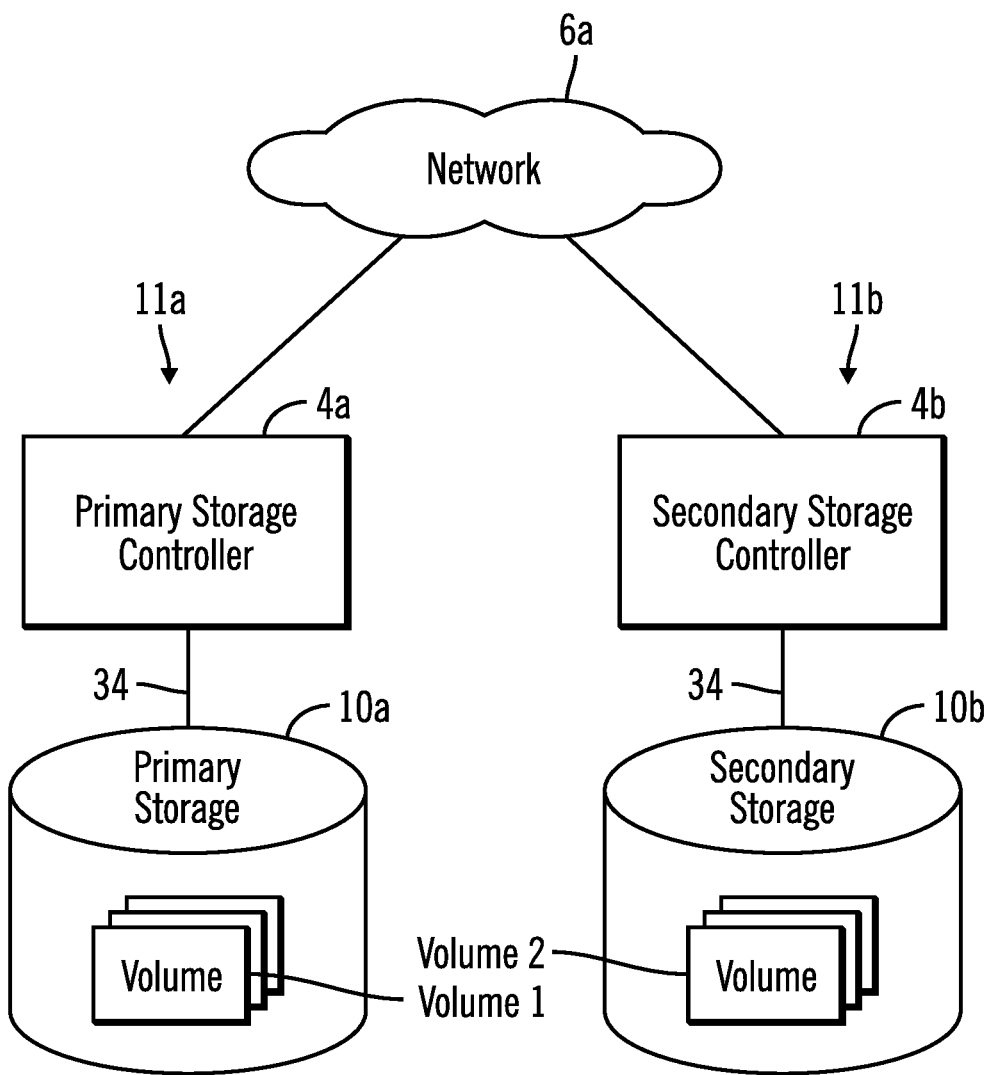
FIG. 3 illustrates an example of a primary and secondary data storage system including storage controllers of the computing environment of FIG. 1, employing adaptive caching in a multi-tier cache in accordance with one aspect of the present description.

FIG. 2 shows in greater detail an example of a data storage system 11 employing adaptive caching in a multi-tier cache in accordance with the present description. The data storage system 11 is similar to and representative of the data storage systems of FIG. 1 which include the storage controllers 4a, 4b . . . 4n and storage 10a, 10b . . . 10n. FIG. 3 illustrates an example of a storage system having a primary data storage system 11a and a secondary data storage system 11b, in which one or both of the primary or secondary storage systems employ adaptive caching in a multi-tier cache in accordance with one aspect of the present description.

Each data storage system 11 (FIG. 2), 11a, 11b (FIG. 3) includes a storage controller or control unit 4 (FIG. 2), 4a (FIG. 1), 4b . . . 4n which accesses data at volumes 12 (FIG. 2), volume1, volume2 (FIG. 3) (e.g., LUNs (Logical Units), Logical Devices, Logical Subsystems, etc.) in storage represented by one or more storage drives 10 (FIG. 2), 10a, (FIG. 1), 10b . . . 10n. Each storage controller 4, 4a, 4b . . . 4n includes a CPU complex 14 (FIG. 2), including processor resources provided by one or more processors or central processing units, each having a single or multiple processor cores. In this embodiment, a processor core contains the components of a CPU involved in executing instructions, such as an arithmetic logic unit (ALU), floating point unit (FPU), and/or various levels of cache (such as L1 and L2 cache), for example. It is appreciated that a processor core may have other logic elements in addition to or instead of those mentioned herein.

Each storage controller 4 (FIG. 2), 4a (FIG. 1), 4b . . . 4n further has a memory 20 (FIG. 2) that includes a storage manager 24 for managing storage operations including writing data to or reading data from an associated storage 10, 10a (FIG. 1), 10b, . . . 10n respectively, in response to an I/O data request from a host. The storage operations managed by the storage manager 24 further include data replication operations from a primary volume1 (FIG. 3) of a primary data storage system such as the data storage system 11a, for example, to a secondary volume2 at a secondary data storage system such as the data storage system 11b, for example. The storage manager 24 is configured to generate copies of the primary volume1 (FIG. 3) of the primary data storage system 11a as a secondary volume2 (FIG. 3) of the secondary data storage system 11b. The pair of volumes, volume1, volume2 are in a copy relationship such that updates to the primary volume1 are replicated to the secondary volume2.

In the illustrated embodiment, the memory 20 further includes an extended cache which is a multi-tier cache 44 which provides faster access to data for input/output operations as compared to storage such as the storage 10. Data to be read may be first staged by the storage manager 24 into the multi-tier cache 44 from storage 10 and then read directly from the multi-tier cache 44 instead of directly from the storage 10 to provide faster access to read data. Conversely, data to be written or otherwise updated may be first written to or updated in the multi-tier cache 44 and then destaged to storage 10 which is typically non-volatile storage, that is, the data persists in the non-volatile storage notwithstanding a loss of power to the storage.

Figure 4:
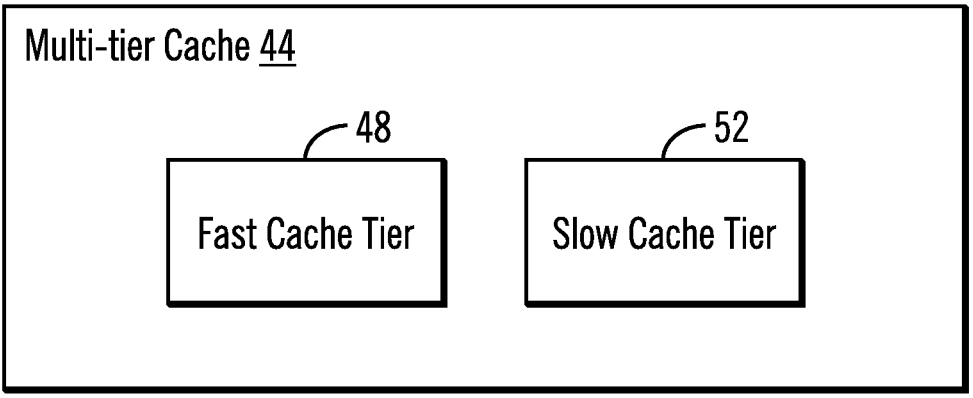
FIG. 4 illustrates an example of a multi-tier cache of the computing environment of FIG. 1, employing adaptive caching in accordance with one aspect of the present description.

As shown in FIG. 4, the multi-tier cache 44 of the illustrated embodiment, has multiple tiers of varying access speed or capacity, or both. In the embodiment of FIG. 4, the multi-tier cache 44 includes a fast access cache tier such as fast cache tier 48 which may be implemented with volatile DRAM memory, for example. A second, somewhat slower access tier indicated as the slow cache tier 52 in FIG. 4 has greater read or write latency as compared to the fast cache tier 48 but may have larger capacity, for example, as compared to the fast cache tier 48. The slow cache tier 52 may be implemented with storage class memory (SCM), for example which may include NAND type memory, for example. It is appreciated that the number of tiers, and the types of memory implementing each tier may vary, depending upon the particular application.

The multiple tiers 48, 52 are used effectively as a single, extended cache 44. In one embodiment, a cache directory is provided for the fast cache tier 48 and a cache directory is provided for the slow cache tier 52. One least recently used (LRU) list is maintained for tracks in the fast cache tier 48 and another least recently used (LRU) list is maintained for tracks in the slow cache tier 52. In the illustrated embodiment, the cache tiers 48, 52 are divided into 4K segments and each segment has a 256 byte descriptor associated with it. A track written or staged to the cache 44 may have from 2 to 17 segments, depending upon how complete or incomplete the track is. It is appreciated that cache scanning techniques other than LRU may be utilized and that the data may be formatted using other data subunits other than tracks and segments, depending upon the particular application, and that the quantities of subunits may vary, depending upon the particular application.

A local memory interface may be used to communicate with the fast cache tier 48, such as for a DRAM, and a storage device interface may be used to communicate with the slow cache tier 52, such as Non-Volatile Memory Express (NVME) to communicate with flash memory and SSDs. In one embodiment, the fast cache tier 48 may comprise a high cost and very low latency device such as a Dynamic Random Access Memory (DRAM) or Static Random Access Memory (SRAM), and the slow cache tier 52 may comprise less expensive and higher latency and higher capacity storage devices such as non-volatile random access memory (NVRAM), including Magnetoresistive Random Access Memory (MRAM), Phase Change Memory (PCM), Resistive Random Access Memory (RRAM), spin transfer torque memory (STM-RAM), conductive bridging RAM (CBRAM), NAND memory devices, such as flash memory and solid state drives (SSDs), etc. In one embodiment, the slow cache tier 52 may include storage devices having different endurance profiles with different number of available erase cycles, such that higher level of the memory devices allow for a greater number of erase cycles, i.e., greater endurance, than the lower level of the memory devices.

The storage manager 24 includes multi-tier adaptive caching logic 54 (FIG. 2) which can significantly improve cache management of staging and prestaging of sectors of tracks, partial tracks and full tracks from storage 10 to the multi-tier cache 44. In one aspect, staging of data to the fast cache tier 48 is maintained in a non-adaptive sector caching mode in which data staged in response to a read request is limited to track sectors required to satisfy the read request. By limiting the staging of data in the fast cache tier to a sector caching mode, the number of tracks having data cached in the fast cache tier 48 may be increased, particularly in embodiments in which the fast cache tier 48 is relatively small in capacity as compared to the slow cache tier 52. In one embodiment, staging in the fast cache tier 48 remains in the non-adaptive sector caching mode and does not switch to other modes such as partial track caching or full track caching modes even though historical access conditions may change. As a result, the number of tracks having data cached in the fast cache tier 48 may be increased for a given size of the fast cache tier 48, as compared to other caching modes.

By comparison, in another aspect of multi-tier adaptive caching of the present description, the multi-tier adaptive caching logic 54 stages data to the slow cache tier 52 of the multi-tier cache 44 in a dynamically selected adaptive caching mode of multiple, different adaptive caching modes available for staging data of tracks to the slow cache tier 52. In one embodiment, the multiple available adaptive caching modes from which a caching mode may be selected in adaptive caching for the slow cache tier 52 include an sector adaptive caching mode in which data staged to the slow cache tier 52 in response to a read request identifying at least one sector of a track, is limited in the sector adaptive caching mode to track sectors identified by the read request. Available adaptive caching modes further include a partial track adaptive caching mode in which data staged to the slow cache tier 52 in response to a read request identifying sectors starting at an initial point of access of a track, is limited in the partial track adaptive caching mode, to a portion of a track beginning at the initial point of access of the track for the read request, to the end of track. Another available adaptive caching mode from which a caching mode may be selected in adaptive caching for the slow cache tier 52, is an adaptive caching mode full track mode in which data staged to the slow cache tier 52 in response to a read request identifying sectors starting at an initial point of access of a track, is the entire track irrespective of the initial point of access of the track for the read request.

In one embodiment, the multi-tier adaptive caching logic 54 determines historical access ratios for a set of tracks such as a band of cylinders of tracks having data cached in the slow cache tier 52, periodically updates them and stores them in data structures 55. The multi-tier adaptive caching logic 54 selects for each such set of tracks, an adaptive caching mode of the multiple adaptive caching modes available for staging data of the set of tracks. As explained in greater detail below, an adaptive caching mode is dynamically selected for each such set of tracks for use in the slow cache tier 52 as a function of historical access ratios determined for the set of tracks.

In those embodiments in which the slow cache tier 52 is substantially larger in capacity as compared to the fast cache tier 48, it is appreciated that full track and partial track adaptive caching modes may be more readily accommodated in the slow cache tier 52 as compared to a smaller fast cache tier 48. For example, the increased size of the slow cache tier 52 can reduce the impact of an increase in the quantity of data being staged into the slow cache tier 52 for each track as a result of full track and partial track adaptive caching modes. As a result, the quantity of data cached in the slow cache tier 52 for each track may be increased as a result of full track and partial track adaptive caching modes while the number of tracks having data cached in the slow cache tier 52 may be maintained at relatively high levels as compared to full track and partial track adaptive caching modes in known DRAM type only caches. Accordingly, the increase in the quantity of data being staged into the slow cache tier 52 for each track as a result of full track and partial track adaptive caching modes, is less likely to crowd out other data which is likely to receive hits if it remains in the slow cache tier 52. As a result, full track and partial track adaptive caching modes can improve the overall rate of successful hits to cache in response to data requests directed to tracks of a cylinder band, due to the greater amount of data per track in the cache for that cylinder band. Furthermore, the number of tracks having data cached in the fast cache tier 48 may be increased due to the larger size of the slow cache tier 52 as compared to a typical DRAM type only cache. Furthermore, the adaptive caching of the slow cache tier 52 can switch to a sector adaptive caching mode as conditions warrant.

In yet another aspect of the present description, the memory 20 includes data structures 56 for multiple prestage request queues of varying priority. As explained in greater detail below, requests to prestage tracks from storage to the slow cache tier 52, may be placed on a selected prestage request queue as a function of historical access ratios calculated for a set of tracks for which data is to be prestaged into the slow cache tier 52. In the illustrated embodiment, the multiple prestage request queues of the data structures 56 include a high priority prestage request queue 60 (FIG. 5) to queue high priority prestage requests, a medium priority prestage request queue 64 (FIG. 5) to queue medium priority prestage requests, and a low priority prestage request queue 68 (FIG. 5) to queue low priority prestage requests.

In one embodiment, a request for prestaging a track from storage for a set of tracks having a relatively high historical aspect ratio for accesses to the slow cache tier 52 (FIG. 4) for example, may be placed on the high priority prestage request queue 60, a request for prestaging a track from storage to the slow cache tier 52 for a set of tracks having a relatively intermediate historical aspect ratio for accesses to the slow cache tier 52 (FIG. 4) for example, may be placed on the medium priority prestage request queue 64, and a request for prestaging a track from storage to the slow cache tier 52 for a set of tracks having a relatively low historical aspect ratio for accesses to the slow cache tier 52 (FIG. 4) for example, may be placed on the low priority prestage request queue 68. As explained in greater detail below, the higher priority prestage request queues may be allocated proportionally larger numbers of task dispatches, permitting prestaging for tracks having a higher historical access ratio to have priority over the prestaging for tracks having a relatively lower historical access ratio. In this manner, adaptive caching in a multi-tier cache in accordance with the present description, may improve the efficiency of the computer system. Other aspects and advantages may be realized, depending upon the particular application.

The CPU complex 14 of each storage controller may have multiple clusters of processors, each cluster having its own assigned memory 20, storage manager 24, cache, etc. The processing and memory resources assigned each cluster may be physical, virtual, shared, transferrable or dedicated, depending upon the particular application.

In the illustrated embodiment, the multi-tier adaptive caching logic 54 of the storage controller 4, is depicted as software stored in the memory 20 and executed by the CPU complex 14. However, it is appreciated that the logic functions of the multi-tier adaptive caching logic 54 may be implemented as hardware, software, firmware or any combination of one or more thereof, depending upon the particular application. In addition, logic functions of the multi-tier adaptive caching logic 54 may be implemented in a host or storage in addition to or instead of a storage controller.

In one embodiment, the storage or storage drives 10 (FIG. 2), 10a, 10b . . . 10n (FIG. 1) may be comprised of one or more sequential access storage devices, such as hard disk drives and magnetic tape or may include non-sequential access storage devices such as solid state drives (SSD), for example. Each storage drive 10, 10a, 10b . . . 10n may comprise a single sequential or non-sequential access storage device or may comprise an array of storage devices, such as a Just a Bunch of Disks (JBOD), Direct Access Storage Device (DASD), Redundant Array of Independent Disks (RAID) array, virtualization device, tape storage, flash memory, etc.

The storage devices of the storage drives 10, 10a, 10b . . . 10n may be configured to store data in subunits of data storage such as tracks, extents, blocks, pages, segments, cylinders, volumes, etc. Although adaptive caching in a multi-tier cache in accordance with the present description is described in connection with storage subunits such as tracks, sectors and cylinders, it is appreciated that adaptive caching in a multi-tier cache in accordance with the present description is applicable to other storage subunits such as volumes, extents, blocks, pages, segments, etc.

The system components 1a, 1b . . . 1n, 4, 4a, 4b, . . . 4n, 10, 10a, 10b . . . 10n are connected to the networks 6a, 6b which enable communication among these components via switches, links, and endpoint devices such as adapters. Thus, the networks 6a, 6b include in one embodiment, a fabric which may comprise a Storage Area Network (SAN), Local Area Network (LAN), Intranet, the Internet, Wide Area Network (WAN), peer-to-peer network, wireless network, arbitrated loop network, etc. Communication paths from the storage systems to the hosts 1a, 1b, . . . 1n and from the storage controllers 4, 4a, 4b, . . . 4n to the storage 10, 10a, 10b . . . 10n may be based upon various attachment protocol such as Fibre Connection (FICON), for example. Other communication paths of the fabric may comprise for example, a Fibre Channel arbitrated loop configuration, a serial loop architecture or a bus interface, such as a Peripheral Component Interconnect (PCI) interface such as a PCI-Express interface. The communication paths of the fabric may also be part of an Ethernet network, for example, such that each node has an individual network (internet protocol) address. Other types of communication paths may be utilized, such as a modem telephone path, wireless network, etc., depending upon the particular application.

Communication software associated with the communication paths includes instructions and other software controlling communication protocols and the operation of the communication hardware in accordance with the communication protocols, if any. It is appreciated that other communication path protocols may be utilized, depending upon the particular application.

Figure 6:
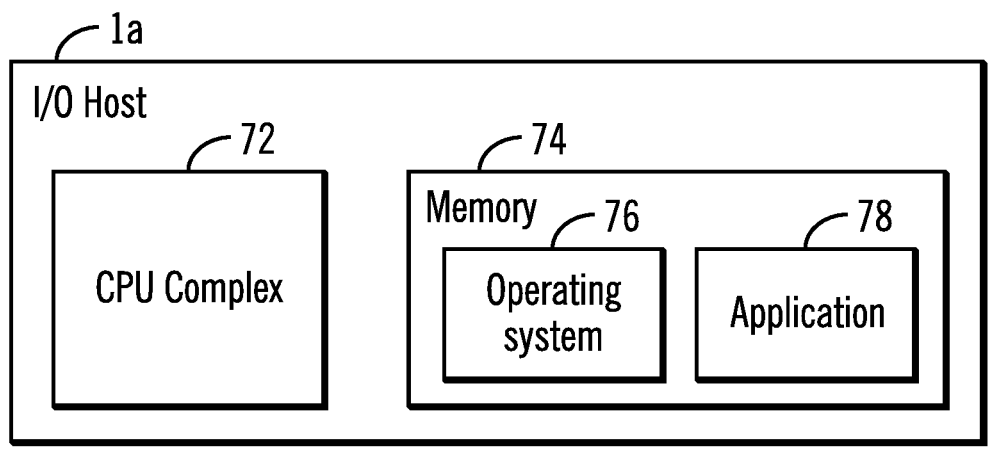
FIG. 6 illustrates an example of a host of the computing environment of FIG. 1, employing adaptive caching in a multi-tier cache in a data storage system in accordance with one aspect of the present description.

A typical host as represented by the host 1a of FIG. 6 includes a CPU complex 72 and a memory 74 having an operating system 76 and an application 78 that cooperate to read data from and write data updates to the primary storage 10a (FIG. 3) or secondary storage 10b via a storage controller 4, 4a, 4b . . . 4n. An example of a suitable operating system is the z/OS operating system. It is appreciated that other types of operating systems may be employed, depending upon the particular application.

Adaptive caching in a multi-tier cache in accordance with the present description, may be applied to any computer system having a memory utilizing logic as represented by the multi-tier adaptive caching logic 54 (FIG. 2). Thus, each host such as the host 1a, for example, may also employ logic for adaptive caching in a multi-tier cache.

The hosts 1a, 1b . . . 1n, the storage controllers 4, 4a, 4b, storage devices 10, 10a, 10b, and the multi-tier adaptive caching logic 54 may each be implemented using any computational device which has been modified for adaptive caching in a multi-tier cache in accordance with the present description. Computational devices suitable for modification as described herein include those presently known in the art, such as, a personal computer, a workstation, a server, a mainframe, a hand held computer, a palm top computer, a telephony device, a network appliance, a blade computer, a processing device, etc. The hosts 1a, 1b . . . 1n, the storage controllers 4, 4a, 4b . . . 4n, storage devices 10, 10a, 10b . . . 10n, and the multi-tier adaptive caching logic 54 may be elements in any suitable network, such as, a storage area network, a wide area network, the Internet, an intranet, or elements in a cloud computing environment.

Figure 5:
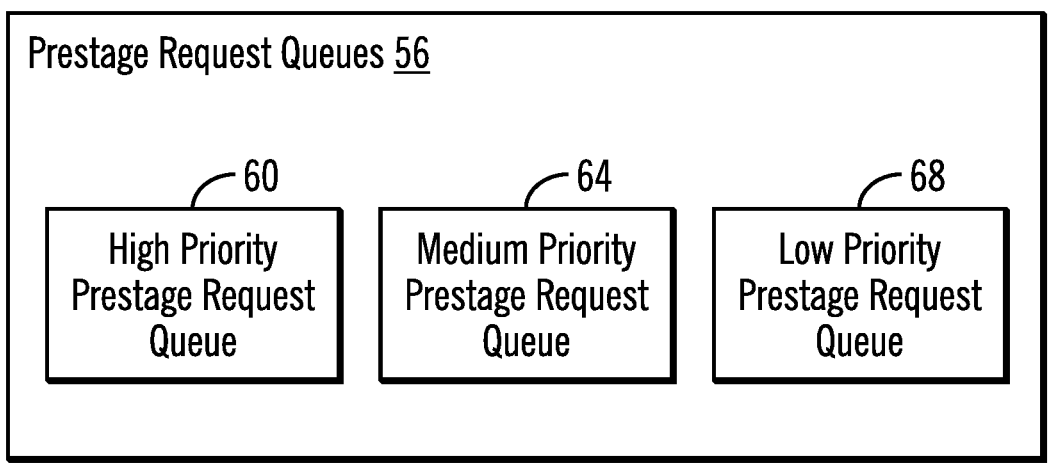
FIG. 5 illustrates an example of multiple prestage request queues of the computing environment of FIG. 1, employing adaptive caching in accordance with one aspect of the present description.

FIGS. 7-11 depict one embodiment of operations of the multi-tier adaptive caching logic 54 (FIG. 2) of the storage controller 4 in connection with the multi-tier cache 44 (FIG. 4) and the multiple pre-staging queues 56 (FIG. 5). In this example, logic elements of the multi-tier adaptive caching logic 54 (FIG. 2) and the multi-tier cache 44 (FIG. 4) and the multiple pre-staging queues 56 (FIG. 5) are configured to perform an embodiment of adaptive caching in a multi-tier cache as depicted in FIGS. 7-11 the accompanying description herein.

In the example of FIG. 7, staging of data to the fast cache tier 48 is maintained (block 204, FIG. 7) in a non-adaptive sector caching mode in which data staged in response to a read request is limited to track sectors required to satisfy the read request. As set forth above, by limiting the staging of data in the fast cache tier 48 to a sector caching mode, the number of tracks having data cached in the fast cache tier 48 may be increased, particularly in embodiments in which the fast cache tier 48 is relatively small in capacity as compared to the slow cache tier 52. In one embodiment, staging in the fast cache tier 48 remains in the non-adaptive sector caching mode and does not switch to other modes such as partial track caching or full track caching modes even though historical access conditions may change. As a result, the number of tracks having data cached in the fast cache tier 48 may be increased for a given size of the fast cache tier 48, as compared to other caching modes.

By comparison, in another aspect of multi-tier adaptive caching of the present description, the multi-tier adaptive caching logic 54 initiates (block 208, FIG. 7) adaptive caching in the slow cache tier 52, which stages data to the slow cache tier 52 of the multi-tier cache 44 in a dynamically selected adaptive caching mode of multiple, different adaptive caching modes available for staging and prestaging data of tracks to the slow cache tier 52. In the embodiment of FIG. 7, the multi-tier adaptive caching logic 54 determines historical access ratios for a set of tracks such as a band of cylinders of tracks having data cached in the slow cache tier 52, and dynamically selects (see FIG. 8) for the set of tracks, an adaptive caching mode of the multiple adaptive caching modes available for staging data of the set of tracks. Accordingly, a determination (block 212, FIG. 7) is made as to whether there has been an access such as a read request, for example, which requests one or more sectors of one or more tracks which may be cached in the slow cache tier 52.

Figure 12:
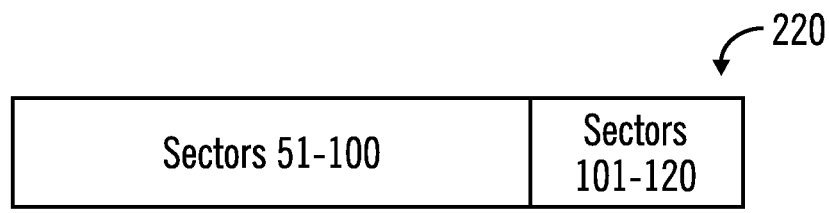
FIG. 12 depicts an example of a partial track for use with adaptive caching in a multi-tier cache in a data storage system in accordance with the present description.

FIG. 12 shows an example of a partial track 220 having 70 of 120 sectors which have been cached in the slow cache tier 52. In this example, a request to access sectors 51-100 caused the partial track 220 of sectors 51-120 to be cached in the slow cache tier 52.

In order to determine which adaptive caching mode to use for staging and prestaging data in connection with a particular request, the following statistics are maintained by counters (FIG. 2) maintained in data structures 224 of the memory 20 for each cylinder band for the slow cache tier 52. The counters of data structures 224 include the following:

Miss Counter—The miss counter is incremented if the requested sector of a track is not in the slow cache tier 52. In the example of FIG. 12, if the requested sector is within missing sectors 1-50 of the track 220, the miss counter is incremented.

Hit Counter—The hit counter is incremented if the requested sector of a track is in the slow cache tier 52. In the example of FIG. 12, if the requested sector is within sectors 51-120 of the track 220, the hit counter is incremented.

Front Access (FA) Counter—The front access counter is incremented if the requested track is in the slow cache tier 52 and the first sector requested by the current request precedes the sector requested by a prior request that caused the track to be promoted, that is, staged into the slow cache tier 52. In the example of FIG. 12, if the requested sector is within sectors 1-50 of the track 220, the FA counter is incremented since the first sector requested by the current request precedes sector 51, the sector requested by a prior request that caused the partial track 220 to be staged into the slow cache tier 52.

Back Access (BA) Counter—The back access counter is incremented if the requested track is in the slow cache tier 52 and the first sector requested by the current request follows the sector requested by a prior request that caused the track to be promoted. In the example of FIG. 12, if the requested sector is within sectors 52-120 of the track 220, the BA counter is incremented since the first sector requested by the current request follows sector 51, the sector requested by a prior request that caused the track 220 to be staged into the slow cache tier 52.

These counters are updated (block 230, FIG. 7) for each access (block 212, FIG. 7) to the slow cache tier 52 requested by a request. A determination (block 234, FIG. 7) is made as to whether the cache access count (sum of hit count and miss count) for a particular cylinder band has reached a threshold. In the illustrated embodiment, in a period defined by approximately every 128 accesses to a cylinder band, the historical access ratios, HFEAR AND HARAR, are periodically updated (block 238, FIG. 7) and the selection of an adaptive caching mode is updated as described below in connection with FIG. 8, for the cylinder band based upon its updated historical access ratios. In this embodiment, historical access ratios are calculated and updated as running averages as follows:

new HFEAR=((FA/(Hit+Miss))+HFEAR)/2 new HARAR=(((FA+BA)/(Hit+Miss))+HARAR)/2

The updated values of the historical access ratios remain the same for an interval of time defined by approximately 128 accesses to a cylinder band until they are updated again when the 128 access threshold is reached again for that cylinder band. It is appreciated that other historical access ratios, statistics and update intervals may be utilized for selection of an adaptive caching mode for the slow cache tier 52, depending upon the particular application.

FIG. 8 depicts one example of operations of the multi-tier adaptive caching logic 54 (FIG. 2) of the storage controller, for selecting for a cylinder band of tracks, an adaptive caching mode for that cylinder band having data cached in the slow cache tier 52, as a function of historical access ratios which were updated (block 238, FIG. 7) for that cylinder band. In this example, upon initiating (block 254, FIG. 8) adaptive caching mode selection for a particular cylinder band of tracks, a determination (block 258, FIG. 8) is made as to whether, the current updated value (block 238, FIG. 7) of the historical alternate record access ratio (HARAR) for the cylinder band of tracks is less than 0.10. If so, the sector adaptive caching mode is selected (block 262, FIG. 8) so as to stage requested sectors only for that cylinder band of the slow cache tier 52. In the sector adaptive caching mode, there is no prestaging of sectors which were not requested.

A HARAR value of less than 0.10 is an indication that front accesses (FAs) and back accesses (BAs) of the requests to the slow cache tier 52 in the cylinder band of tracks are relatively low such that accesses to the slow cache tier 52 for the cylinder band of tracks have been relatively high for the sectors which caused a track of that cylinder band to be promoted to the slow cache tier 52. Accordingly, a sector adaptive caching mode for that cylinder band of tracks of the slow tier cache 52 may increase hits to the slow tier cache 52 since there is no prestaging of sectors which were not requested.

Conversely, if the current updated (block 238, FIG. 7) value of the historical alternate record access ratio (HARAR) for the cylinder band of tracks is greater than or equal to 0.10, a determination (block 266, FIG. 8) is made as to whether the current updated (block 238, FIG. 7) value of the historical front end access ratio (HFEAR) for the cylinder band of tracks is less than 0.05. If so, the partial track adaptive caching mode is selected (block 270, FIG. 8) for that cylinder band of the slow cache tier 52.

As previously mentioned, in partial track adaptive caching mode, only a portion of the track beginning at the initial point of access of the track for the current request, to the end of track, is staged into the slow cache tier 52. Thus, one or more sectors toward the end of the track are prestaged to the slow cache tier 52 in partial track adaptive caching, if those end sectors were not requested in the current request. Any sectors at the front end of the track which were not requested, are not prestaged in partial track adaptive caching.

A HARAR value greater than 0.10 is an indication of a greater proportion of front accesses (FAs) or back accesses (BAs) to the slow cache tier 52 for the cylinder band of tracks as compared to accesses which caused a track of that cylinder band to be promoted to the slow cache tier 52. Thus, the higher the historical alternate record access ratio (HARAR) level, the greater the historical proportion of front accesses (FA) and back accesses (BAs) to the total number of accesses (hits plus misses) for the cylinder band, and the greater the likelihood that caching at least a partial track will lead to an increase in cache hits as compared to requests in an interval having a lower historical alternate record access ratio (HARAR) level.

A historical front end access ratio (HFEAR) for the cylinder band of tracks of less than 0.05, is an indication of a relatively small proportion of front accesses (FAs) to the slow cache tier 52 for the cylinder band of tracks as compared to back accesses (BAs) and accesses which caused a track of that cylinder band to be promoted to the slow cache tier 52. The higher the historical front end access ratio (HFEAR) level, the greater the historical proportion of front accesses (FA) to the total number of accesses (hits plus misses) for the cylinder band, and the greater the likelihood that caching a full track will lead to an increase in cache hits as compared to requests in an interval having a lower historical front end access ratio (HFEAR) level. Accordingly, in an interval having a historical front end access ratio (HFEAR) for the cylinder band of tracks of less than 0.05, only a partial track adaptive caching mode for that cylinder band of tracks of the slow tier cache 52 is selected to increase hits to the slow tier cache 52.

If it is determined (block 266, FIG. 8) that the current updated (block 238, FIG. 7) value of the historical front end access ratio (HFEAR) for the cylinder band of tracks is greater than or equal to 0.05, the full track adaptive caching mode is selected (block 274, FIG. 8) for that cylinder band of the slow cache tier 52. As previously mentioned, in the full track adaptive caching mode, irrespective of access point on the track for the current request, the entire track is staged into the slow cache tier 52. As noted above, a HARAR value greater than or equal to 0.10 is an indication of a greater proportion of front accesses (FAs) or back accesses (BAs) to the slow cache tier 52 for the cylinder band of tracks as compared to accesses which caused a track of that cylinder band to be promoted to the slow cache tier 52. A historical front end access ratio (HFEAR) for the cylinder band of tracks of greater than or equal to 0.05, is an indication of an increased proportion of front accesses (FAs) to the slow cache tier 52 for the cylinder band of tracks as compared to back accesses (BAs) and accesses which caused a track of that cylinder band to be promoted to the slow cache tier 52. The higher the historical front end access ratio (HFEAR) level, the greater the historical proportion of front accesses (FA) to the total number of accesses (hits plus misses) for the cylinder band, and the greater the likelihood that caching a full track will lead to an increase in cache hits as compared to requests in an interval having a lower historical front end access ratio (HFEAR) level. Accordingly, in an interval having a historical front end access ratio (HFEAR) for the cylinder band of tracks of greater than or equal to 0.05, a full track adaptive caching mode is selected for that cylinder band of tracks of the slow tier cache 52 to increase hits to the slow tier cache 52.

Upon selection (blocks 262, 270, 274, FIG. 8) of an adaptive caching mode for a cylinder band of tracks in response to an update (block 238, FIG. 7) of the historical access statistics for that cylinder band of tracks, the adaptive caching mode selection is concluded (block 278, FIG. 8) until the historical access statistics for that cylinder band of tracks is again updated (block 238, FIG. 7). FIG. 8 depicts various threshold levels for historical access statistics for dynamically selecting an adaptive caching mode based upon the levels of those historical access statistics as they are updated. However, it is appreciated that the particular threshold levels and the particular historical access statistics chosen for adaptive caching mode dynamic selection for the slow cache tier 52, may vary, depending upon the particular application.

Figure 9:
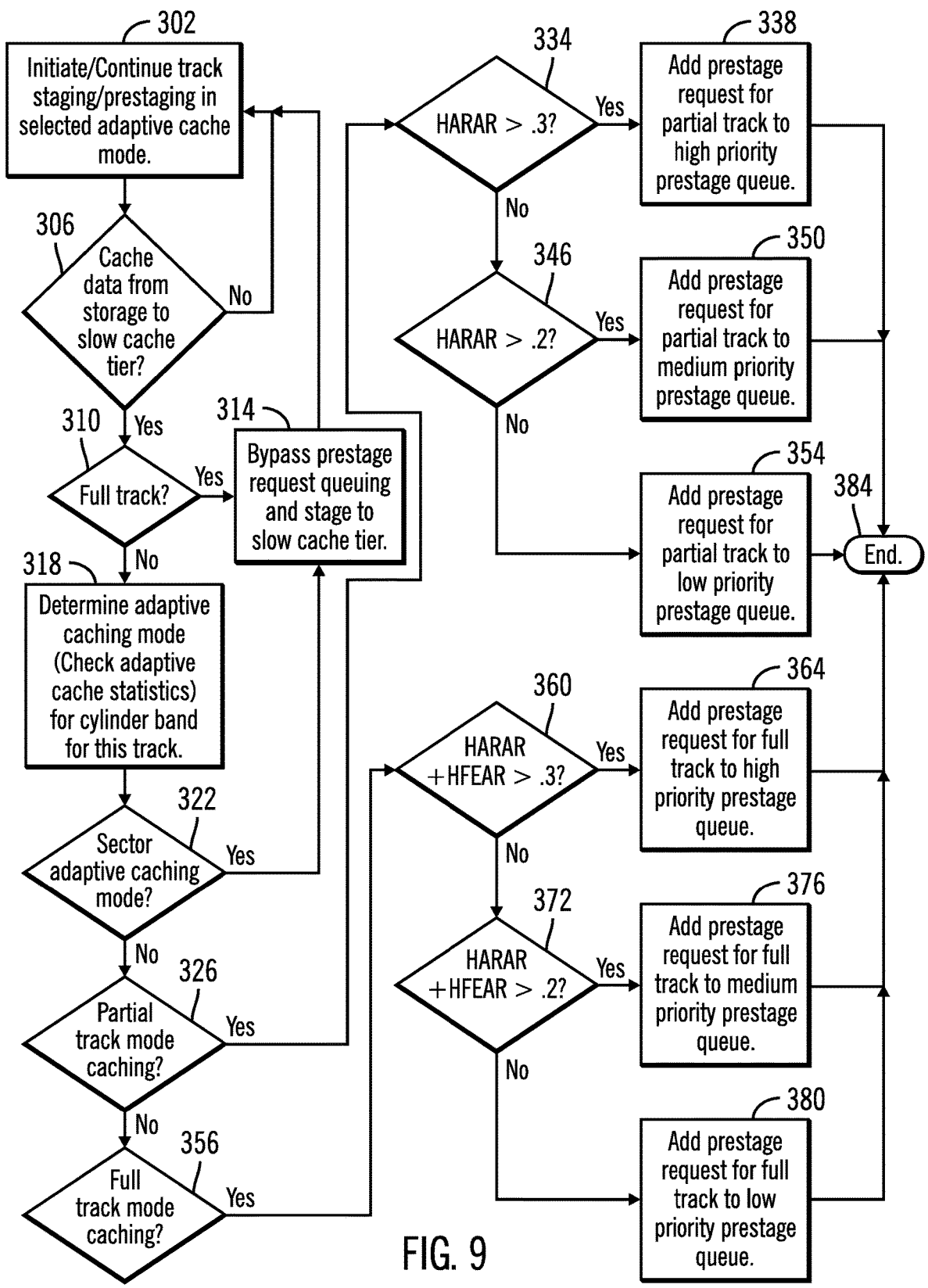
FIG. 9 illustrates an example of operations of components of the computing environment of FIG. 1, including operations of enqueueing prestage requests on a selected prestage request queue of multiple priority prestage request queues employing adaptive caching in accordance with one aspect of the present description.

FIG. 9 depicts one example of operations of the multi-tier adaptive caching logic 54 (FIG. 2) of the storage controller for enqueueing prestage requests on a selected prestage request queue of multiple priority prestage request queues employing adaptive caching in accordance with one aspect of the present description. In one embodiment, prestaging requests may be assigned varying levels of priority as a function of the adaptive caching mode selected for the slow cache tier, and also as a function of the levels of historical access ratios computed for each cylinder band of tracks for the slow cache tier as described below.

Upon selection (FIG. 8) of an adaptive caching mode for the slow cache tier 52, staging or prestaging of data from storage to the slow cache tier 52 is initiated (or continued) (block 302, FIG. 9) in response to requests for data from the slow cache tier 52. A determination (block 306, FIG. 9) is made as to whether data is to be cached in the slow cache tier 52 from storage 10. Typically, if data requested in a request is not found (a cache miss) in the slow cache tier 52 or it is anticipated that the data will be requested from the slow cache tier 52, data is transferred from the storage to the slow cache tier 52 either in a staging operation or in a prestaging operation in which a prestage request is enqueued on a prestage request queue prior to executing the prestage request as described below.

In one aspect of multi-tier adaptive caching in accordance with the present description, if it is determined (block 310, FIG. 9) that the data to be cached in the slow cache tier 52 from storage 10 is a full track of data, no prestaging is indicated for that track because all sectors of the track have already been requested. Accordingly, enqueuing a prestage request on a prestage request queue is bypassed (block 314, FIG. 9) for that track, and instead, the full track of data is staged to the slow cache tier 52 (block 314, FIG. 9). Conversely, if it is determined (block 310, FIG. 9) that the data to be cached in the slow cache tier 52 from storage 10 is less than a full track of data, a determination (block 318, FIG. 9) is made to identify the current adaptive caching mode for the cylinder band of tracks to which the caching operation (block 306, FIG. 9) is directed. If it is determined (block 322, FIG. 9) that the current adaptive caching mode was selected to be the sector adaptive caching mode for the particular cylinder band of tracks to which the caching operation (block 306, FIG. 9) is directed, again no prestaging is indicated because only requested sectors of the track will be cached in the sector adaptive caching mode. Accordingly, enqueuing a prestage request on a prestage request queue is again bypassed (block 314, FIG. 9), and instead, the requested sectors of data are staged to the slow cache tier 52 (block 314, FIG. 9).

Conversely, if it is determined (block 326, FIG. 9) that the current adaptive caching mode was selected to be the partial track adaptive caching mode for the particular cylinder band of tracks to which the caching operation (block 306, FIG. 9) is directed, a determination (block 334, FIG. 9) is made as to whether the current updated (block 238, FIG. 7) value of the historical alternate record access ratio (HARAR) for the cylinder band of tracks is greater than 0.30. As noted above in connection with FIG. 7, the historical alternate record access ratio (HARAR) is updated periodically for each cylinder band of tracks as a running average and provides an indication of the historical proportion of front accesses (FAs) and back accesses (BAs) to the total number of accesses (hits plus misses) for the particular cylinder band.

The higher the historical alternate record access ratio (HARAR) level, the greater the historical proportion of front accesses (FA) and back accesses (BAs) to the total number of accesses (hits plus misses) for the cylinder band, and the greater the likelihood that caching at least a partial track will lead to an increase in cache hits as compared to partial track prestage requests in an interval having a lower historical alternate record access ratio (HARAR) level.

In one embodiment, in an interval in which the last updated value of the historical alternate record access ratio (HARAR) is at a relatively high level such as greater than 0.3 (block 334, FIG. 9) for example, a request to prestage a partial track in the partial track adaptive caching mode in that interval, is deemed a relatively high priority prestage request since the partial track to be cached has a relatively high likelihood to result in an increase of hits to the slow cache tier 52 as compared to requests in an interval having a lower historical alternate record access ratio (HARAR) level. Accordingly, the partial track prestage request is enqueued (block 338, FIG. 9) on the high priority prestage request queue 60 to await execution.

If it is determined (block 326, FIG. 9) that the current adaptive caching mode was selected to be the partial track adaptive caching mode for the particular cylinder band of tracks to which the caching operation (block 306, FIG. 9) is directed, and it is determined (block 346, FIG. 9) that the current updated (block 238, FIG. 7) value of the historical alternate record access ratio (HARAR) for the cylinder band of tracks is at an intermediate level of greater than 0.20, but not greater than 0.30 (block 334, FIG. 9), a request to prestage a partial track in the partial track adaptive caching mode in that interval, is deemed a relatively intermediate priority prestage request since the partial track to be cached has a relatively intermediate likelihood to result in an increase of hits to the slow cache tier 52 as compared to requests in an interval having a higher or lower historical alternate record access ratio (HARAR) level. Accordingly, the partial track prestage request is enqueued (block 350, FIG. 9) on the medium priority prestage request queue 64.

If it is determined (block 326, FIG. 9) that the current adaptive caching mode was selected to be the partial track adaptive caching mode for the particular cylinder band of tracks to which the caching operation (block 306, FIG. 9) is directed, and it is determined (block 346, FIG. 9) that the current updated (block 238, FIG. 7) value of the historical alternate record access ratio (HARAR) for the cylinder band of tracks is less than 0.20, a request to prestage a partial track in the partial track adaptive caching mode in that interval, is deemed a relatively low priority prestage request since the partial track to be cached has a relatively low likelihood to result in an increase of hits to the slow cache tier 52 as compared to requests in an interval having a higher historical alternate record access ratio (HARAR) level. Accordingly, the partial track prestage request is enqueued (block 354, FIG. 9) on the low priority prestage request queue 68.

If it is determined (block 356, FIG. 9) that the current adaptive caching mode was selected to be the full track adaptive caching mode for the particular cylinder band of tracks to which the caching operation (block 306, FIG. 9) is directed, a determination (block 360, FIG. 9) is made as to whether the sum of the current updated (block 238, FIG. 7) values of the historical alternate record access ratio (HARAR) and the historical front end access ratio (HFEAR) for the cylinder band of tracks is greater than 0.30. As noted above in connection with FIG. 7, the historical front end access ratio (HFEAR) is also updated periodically for each cylinder band of tracks as a running average and provides an indication of the historical proportion of front accesses (FA) to the total number of accesses (hits plus misses) for the particular cylinder band. The higher the historical front end access ratio (HFEAR) level, the greater the historical proportion of front accesses (FA) to the total number of accesses (hits plus misses) for the cylinder band, and the greater the likelihood that caching a full track will lead to an increase in cache hits as compared to full track prestage requests in an interval having a lower historical alternate record access ratio (HFEAR) level.

In one embodiment, in an interval in which the sum of the last updated value of the historical alternate record access ratio (HARAR) and the last updated value of the historical front end access ratio (HFEAR) is at a relatively high level such as greater than 0.3 (block 360, FIG. 9) for example, a request to prestage a full track in the full track adaptive caching mode in that interval, is deemed a relatively high priority prestage request since the full track to be cached has a relatively high likelihood to result in an increase of hits to the slow cache tier 52 as compared to full track prestage requests in an interval having a lower sum of the last updated value of the historical alternate record access ratio (HARAR) and the last updated value of the historical front end access ratio (HFEAR). Accordingly, the full track prestage request is enqueued (block 364, FIG. 9) on the high priority prestage request queue 60 to await execution.

If it is determined (block 356, FIG. 9) that the current adaptive caching mode was selected to be the full track adaptive caching mode for the particular cylinder band of tracks to which the caching operation (block 306, FIG. 9) is directed, and it is determined (block 372, FIG. 9) that the sum of the current updated (block 238, FIG. 7) values of the historical alternate record access ratio (HARAR) and the historical front end access ratio (HFEAR) for the cylinder band of tracks is greater than 0.20 but not greater than 0.30 (block 360, FIG. 9)), a prestage request for a full track of data is enqueued (block 376, FIG. 9) on the medium priority prestage request queue 64. In one embodiment, in an interval in which the sum of the last updated value of the historical alternate record access ratio (HARAR) and the last updated value of the historical front end access ratio (HFEAR) is at a relatively intermediate level such as greater than 0.2 (block 372, FIG. 9) but not greater than 0.3 (block 360, FIG. 9) for example, a request to prestage a full track in the full track adaptive caching mode in that interval, is deemed a relatively intermediate priority prestage request since the full track to be cached has a relatively intermediate likelihood to result in an increase of hits to the slow cache tier 52 as compared to requests in an interval having a higher or lower sum of the last updated value of the historical alternate record access ratio (HARAR) and the last updated value of the historical front end access ratio (HFEAR). Accordingly, the full track prestage request is enqueued (block 376, FIG. 9) on the intermediate priority prestage request queue 64 to await execution.

If it is determined (block 356, FIG. 9) that the current adaptive caching mode was selected to be the full track adaptive caching mode for the particular cylinder band of tracks to which the caching operation (block 306, FIG. 9) is directed, and it is determined (block 372, FIG. 9) that the sum of the current updated (block 238, FIG. 7) values of the historical alternate record access ratio (HARAR) and the historical front end access ratio (HFEAR) for the cylinder band of tracks is less than 0.20, a prestage request for a full track of data is enqueued (block 380, FIG. 9) on the low priority prestage request queue 64. In one embodiment, in an interval in which the sum of the last updated value of the historical alternate record access ratio (HARAR) and the last updated value of the historical front end access ratio (HFEAR) is at a relatively low level such as less than or equal to 0.2 (block 372, FIG. 9) for example, a request to prestage a full track in the full track adaptive caching mode in that interval, is deemed a relatively low priority prestage request since the full track to be cached has a relatively low likelihood to result in an increase of hits to the slow cache tier 52 as compared to requests in an interval having a higher sum of the last updated value of the historical alternate record access ratio (HARAR) and the last updated value of the historical front end access ratio (HFEAR). Accordingly, the full track prestage request is enqueued (block 380, FIG. 9) on the low priority prestage request queue 68 to await execution.

Upon enqueueing (blocks 338, 350, 354, 364, 376, 380, FIG. 9) a prestage request on a selected prestage request queue 60, 64, 68, the enqueueing is concluded (block 384, FIG. 9) until additional data is to be cached (blocks 302, 306, FIG. 9). FIG. 9 depicts various threshold levels for various historical access statistics for selecting a prestage request queue for prestage requests based upon the levels of those historical access statistics as they are updated. However, it is appreciated that the particular threshold levels and the particular historical access statistics chosen for adaptive caching prestage request enqueueing for the slow cache tier 52, may vary, depending upon the particular application.

Figure 10:
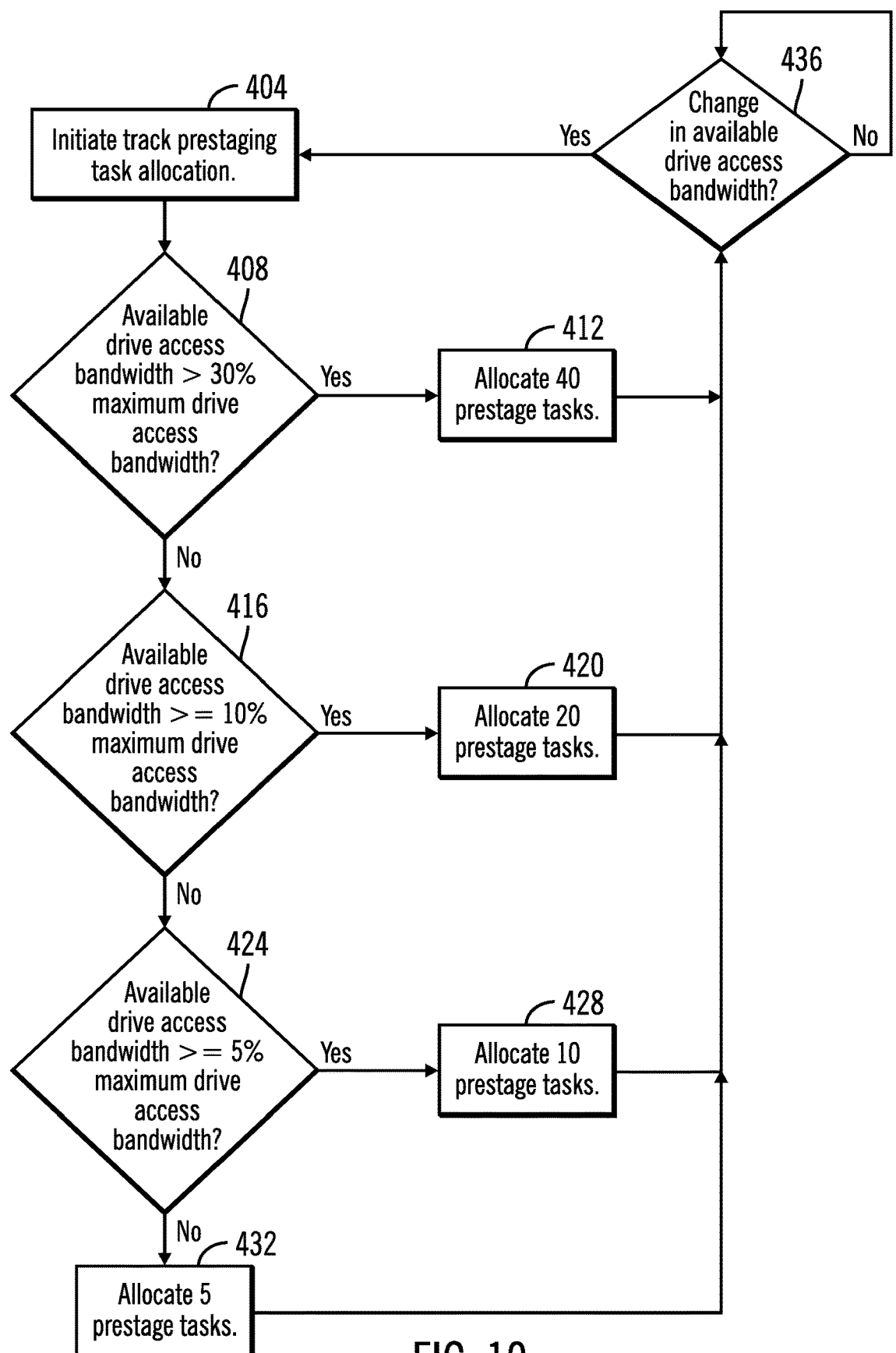
FIG. 10 illustrates an example of operations of components of the computing environment of FIG. 1, including operations of allocating prestage tasks for executing prestage requests from multiple priority prestage request queues in accordance with one aspect of the present description.
Figure 11:
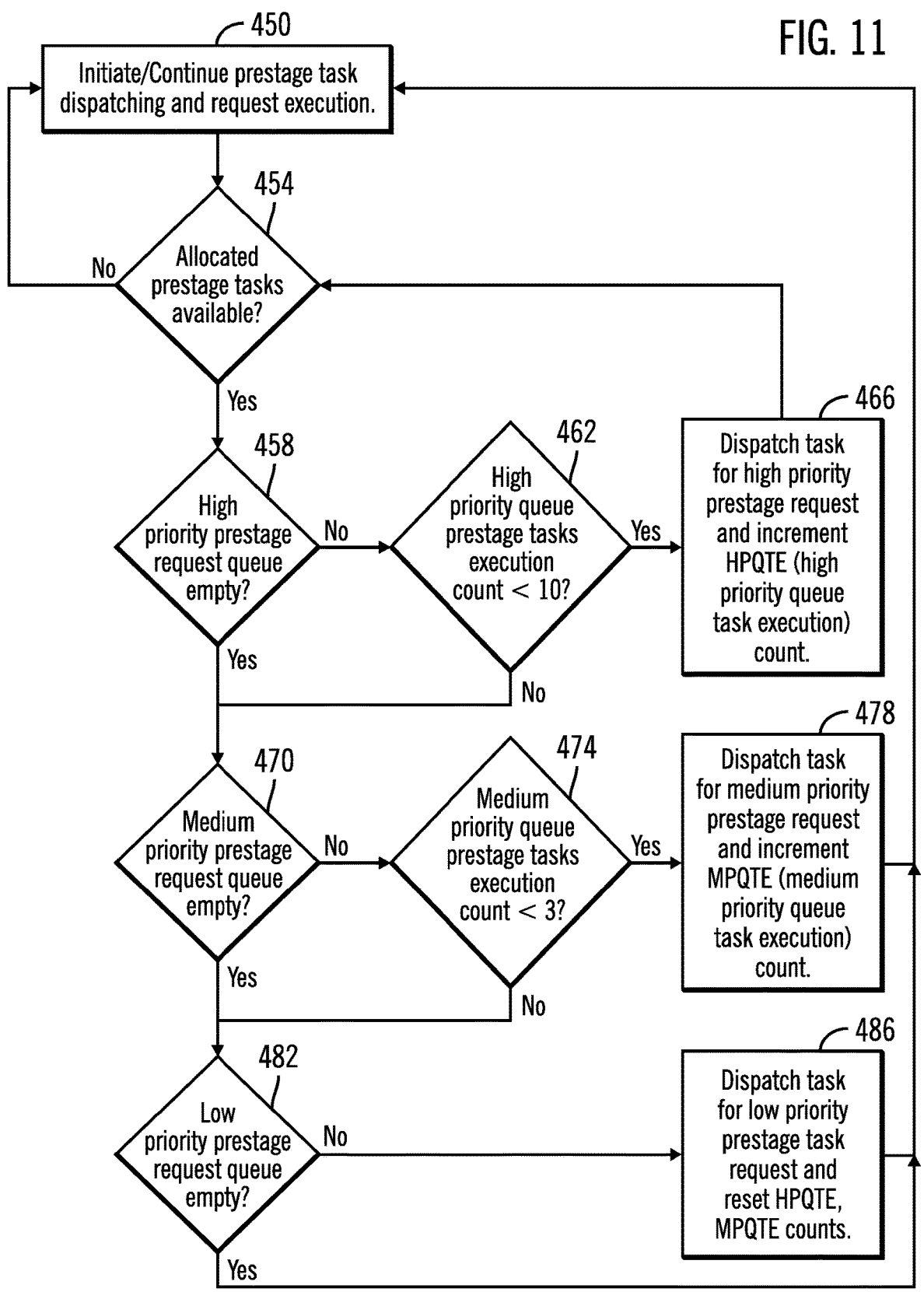
FIG. 11 illustrates an example of operations of components of the computing environment of FIG. 1, including operations of dispatching prestage tasks to execute prestage requests from multiple priority prestage request queues in accordance with one aspect of the present description.

Once a request to prestage data for a track reaches the front of a priority prestage request queue 60, 64, 68, and an allocated task is available for dispatching, the available allocated task is dispatched to execute the prestage request at the front of the queue and the data requested by that prestage request is prestaged into the slow cache tier 52. FIG. 10 depicts one example of operations of the multi-tier adaptive caching logic 54 to allocate tasks for executing queued prestage requests as a function of available storage drive access bandwidth for prestaging data from the storage 10 to the slow cache tier 52. In addition, FIG. 11 depicts one example of operations of the multi-tier adaptive caching logic 54 to distribute dispatching of allocated tasks for executing queued prestage requests as a function of the priority level of the prestage request queues 60, 64, 68.

Turning first to FIG. 10, upon initiation (block 404, FIG. 10) of track prestaging task allocation, a determination is made as to whether (block 408, FIG. 10) the available drive access bandwidth exceeds a certain threshold, such as thirty percent of the maximum drive access bandwidth, for example. If so, a relatively large number of prestage tasks are allocated (block 412, FIG. 10), such as, 40 prestage tasks, in this example.

Conversely if it is determined (block 408, FIG. 10) that the available drive access bandwidth does not exceed thirty percent of the maximum drive access bandwidth, a determination is made as to whether (block 416, FIG. 10) the available drive access bandwidth is greater than or equal to a lower threshold such as ten percent, for example, (but not exceeding thirty percent) of the maximum drive access bandwidth. If so, a relatively intermediate number of prestage tasks are allocated (block 420, FIG. 10), such as 20 prestage tasks, in this example.

Alternatively, if it is determined (block 416, FIG. 10) that the available drive access bandwidth is not greater than or equal to ten percent of the maximum drive access bandwidth, a determination is made as to whether (block 424, FIG. 10) the available drive access bandwidth is greater than or equal to a still lower threshold, such as five percent, for example, (but not greater than or equal to ten percent) of the maximum drive access bandwidth. If so, a still lesser number of prestage tasks are allocated (block 428, FIG. 10), such as, 10 prestage tasks, in this example.

As another alternative, if it is determined (block 424, FIG. 10) that the available drive access bandwidth is not greater than or equal to five percent of the maximum drive access bandwidth, a still smaller number of prestage tasks are allocated (block 432, FIG. 10), such as, 5 prestage tasks in this example. Once the number of prestage tasks have been allocated, the available drive access bandwidth is periodically checked (block 436, FIG. 10). Should there be a significant change, the prestage task allocation may be reinitiated (block 404, FIG. 10) to reset the number of allocated prestage tasks at an appropriate level for a given level of available drive access bandwidth. In this manner, the multi-tier adaptive caching logic 54 allocates a quantity of tasks for executing queued prestage requests as a function of available storage drive access bandwidth for prestaging data from the storage 10 to the slow cache tier 52. In this embodiment, the greater the available drive access bandwidth, the larger the number of prestage tasks that are allocated.

The particular allocation thresholds described above and the associated quantity of prestage task allocations associated with each threshold, are provided for illustration purposes. It is appreciated that allocation thresholds and the associated quantity of task allocations associated with each threshold, may vary depending upon the particular application. It is further appreciated that prestage task allocations may be a function of other criteria in addition to or instead of available drive bandwidth, such as processor or memory resource availability, for example.

As depicted in FIG. 11, once prestage tasks have been allocated, an allocated prestage task may be dispatched to execute a prestage request which has been queued on one of the prestage request queues 60, 64, 68. In this example, for each task dispatched for the low priority prestage request queue 68, up to three tasks are dispatched for the medium priority prestage request queue 64 and up to ten tasks are dispatched for the high priority prestage request queue 60. It is appreciated that the task dispatching limits imposed on individual prestage request queues and the ratios of tasks dispatches for the respective prestage request queues, may vary, depending upon the particular application.

Accordingly, upon initiation (block 450, FIG. 11) or continuation of dispatching of the allocated prestage tasks, a determination is made as to whether (block 454, FIG. 11) any of the allocated tasks are currently available to be dispatched for execution of a prestage request which has been enqueued on a prestage request queue 60, 64, 68. If not, that is, if all allocated tasks are currently in use in the execution of prestage requests, the execution of those prestage requests continues (block 450, FIG. 11). Once the execution of a prestage request is completed by the prestaging of the requested data to the slow cache tier 52, the allocated task dispatched to execute that prestage request becomes available for dispatching to initiate execution of another prestage request enqueued on one of the prestage request queues.

Once it is determined (block 454, FIG. 11) that an allocated task has become available for dispatching to initiate execution of another prestage request which has been enqueued on a prestage request queue 60, 64, 68, a determination is made as to whether (block 458, FIG. 11) the high priority prestage request queue 60 is empty. If not, a determination is made as to whether (block 462, FIG. 11) a count referred to herein as a High Priority Queue Task Execution (HPQTE) count which keeps track of the number of allocated tasks dispatched to initiate execution of prestage requests from the high priority prestage request queue 60, has reached a limit. In the illustrated embodiment, a limit of ten dispatches of allocated tasks is placed on the dispatching of prestage requests from the high priority prestage request queue 60, before a lower priority prestage request queue 64, 68 is afforded an opportunity to use an allocated task to dispatch a prestage request enqueued on the lower priority request queues, 64, 68. It is appreciated that other limits, smaller or larger, may be employed, depending upon the particular application.

Thus, if it is determined (block 462, FIG. 11) that the limit of ten dispatches of allocated tasks for prestage requests from the high priority prestage request queue 60 has not been reached, that is, the HPQTE count remains below ten, an available task is dispatched (block 466, FIG. 11) to initiate the execution of a prestage request which has reached the front of the high priority prestage request queue 60, and the HPQTE count is incremented. Upon completion of the requested prestaging of data, the completed request is removed from the high priority prestage request queue 60 and the task dispatched to execute that request is made available (block 454, FIG. 11) for another prestage request which has reached the front of a prestage request queue.

In this manner, up to ten dispatches of allocated tasks for prestage requests from the high priority prestage request queue 60 are permitted so long as the high priority prestage request is not empty, that is, it has enqueued prestage requests awaiting dispatching on the high priority prestage request queue 60. However, once the high priority prestage request queue 60 becomes empty (block 458, FIG. 11) or the limit of ten dispatches of allocated tasks for prestage requests enqueued on the high priority prestage request queue 60 has been reached, the lower priority prestage request queues 64, 68 are afforded an opportunity to use an allocated task to dispatch a prestage request enqueued on the lower priority request queues, 64, 68.

In this manner, the high priority prestage request queue 60 does not use up all the allocated tasks. As noted above in connection with FIG. 10, different numbers of tasks may be allocated for dispatching to initiate execution of prestage requests, depending upon available drive access bandwidth. Thus, if more than ten tasks are allocated, for example, tasks can be available for dispatching for prestage requests enqueued on the lower priority queues 64, 68 once the limit of ten dispatches has been reached (block 462, FIG. 11) for the high priority prestage request queue 60. Tasks may also be available for dispatching for prestage requests enqueued on the lower priority queues 64, 68 if the high priority prestage request queue becomes empty (block 458, FIG. 11) before the limit of ten dispatches has been reached for the high priority prestage request queue 60.

Conversely, if ten or fewer tasks are allocated due to low available drive access bandwidth, there may be no allocated tasks immediately available for dispatching for prestage requests enqueued on the lower priority queues 64, 68. However, once the limit of ten dispatches for the high priority prestage request queue 60 is reached or the high priority queue 60 no longer has prestage requests enqueued and awaiting dispatching, tasks may be dispatched for the lower priority queues 64, 68 once additional tasks become available. Thus, even with a low allocation of tasks due to low available drive access bandwidth, allocated tasks will eventually become available for dispatching for prestage requests enqueued on the lower priority queues 64, 68 once the limit of ten dispatches has been reached (block 462, FIG. 11), for the high priority prestage request queue 60 or the high priority prestage request queue becomes empty (block 458, FIG. 11), which ever occurs first.

Accordingly, once the high priority prestage request queue 60 becomes empty (block 458, FIG. 11) or the limit of ten dispatches for prestage requests enqueued on the high priority prestage request queue 60 is reached (block 462, FIG. 11), a determination is made as to whether (block 470, FIG. 11) the medium priority prestage request queue 64 is empty. If not, a determination is made as to whether (block 474, FIG. 11) a count referred to herein as a Medium Priority Queue Task Execution (MPQTE) count which keeps track of the number of allocated tasks dispatched to initiate execution of prestage requests from the medium priority prestage request queue 64. In the illustrated embodiment, a limit of three dispatches of allocated tasks is placed on the dispatching of prestage requests from the medium priority prestage request queue 64, before the low priority prestage request queue 68 is afforded an opportunity to use an available allocated task to dispatch a prestage request enqueued on the low priority request queue 68. It is appreciated that other limits, smaller or larger, may be employed, depending upon the particular application.

Thus, if it is determined (block 474, FIG. 11) that the limit of three dispatches of allocated tasks for prestage requests from the medium priority prestage request queue 64 has not been reached, that is, the MPQTE count remains below three, an available task is dispatched (block 478, FIG. 11) to initiate the execution of a prestage request which has reached the front of the medium priority prestage request queue 64, and the MPQTE count is incremented. Upon completion of the requested prestaging of data, the completed request is removed from the medium priority prestage request queue 64 and the task dispatched to execute that request is made available (block 454, FIG. 11) for another prestage request which has reached the front of a prestage request queue.

In this manner, up to three dispatches of allocated tasks for prestage requests from the medium priority prestage request queue 64 are permitted so long as the medium priority prestage request is not empty, that is, it has enqueued prestage requests awaiting dispatching on the medium priority prestage request queue 64. However, once the medium priority prestage request queue 64 becomes empty (block 470, FIG. 11) or the limit of three dispatches of allocated tasks for prestage requests enqueued on the medium priority prestage request queue 64 has been reached, the low priority prestage request queue 68 is afforded an opportunity to use an available allocated task to dispatch a prestage request enqueued on the low priority request queue 68.

As a result, the medium priority prestage request queue 64 does not use up all the available allocated tasks remaining after the high priority limit has been reached or the high priority prestage request queue 60 has been emptied. As noted above in connection with FIG. 10, different numbers of tasks may be allocated for dispatching to initiate execution of prestage requests, depending upon available drive access bandwidth. Thus, if more than thirteen tasks are allocated, and 10 tasks are dispatched for the high priority queue 60 and three tasks are dispatched for the medium priority queue 64, for example, tasks can be available for dispatching for prestage requests enqueued on the low priority queue 68 once the limit of ten dispatches has been reached (block 462, FIG. 11) for the high priority prestage request queue 60 and the limit of three dispatches has been reached (block 474, FIG. 11) for the medium priority prestage request queue. Also, tasks can be available for dispatching for prestage requests enqueued on the low priority queue 68 if the high priority prestage request queue 60 becomes empty (block 458, FIG. 11) before the limit of ten dispatches has been reached for the high priority prestage request queue 60 or if the medium priority prestage request queue 64 becomes empty (block 470, FIG. 11) before the limit of three dispatches has been reached for the medium priority prestage request queue 64.

Conversely, if less than thirteen tasks are allocated due to low available drive access bandwidth, there may be no tasks immediately available for dispatching for prestage requests enqueued on the low priority queue 68. However, once the limit of ten dispatches for the high priority prestage request queue 60 is reached or the high priority queue 60 no longer has prestage requests enqueued and awaiting dispatching, and the limit of three dispatches for the medium priority prestage request queue 64 is reached or the high priority queue 60 no longer has prestage requests enqueued and awaiting dispatching, a task may be dispatched for the low priority queue once additional tasks become available. Thus, even with a low allocation of tasks due to low available drive access bandwidth, allocated tasks will eventually become available for dispatching for prestage requests enqueued on the low priority queue 68 once the limits for dispatches have been reached for the higher priority queues 60, 64 or one of the higher priority queues 60, 64 becomes empty before the associated limit is reached.

Accordingly, once the medium priority prestage request queue 64 becomes empty (block 470, FIG. 11) or the limit of three dispatches for prestage requests enqueued on the high priority prestage request queue 60 is reached (block 474, FIG. 11), a determination is made as to whether (block 482, FIG. 11) the low priority prestage request queue 68 is empty. If not, an available task is dispatched (block 486, FIG. 11) to initiate the execution of a prestage request which has reached the front of the low priority prestage request queue 68. In addition the HPQTE count is reset to provide the high priority prestage request queue 60 a new limit of ten dispatches since the medium and low priority queues 64, 68 were already afforded an opportunity to dispatch tasks within their respective limits. In a similar manner, the MPQTE count is reset to provide the medium priority prestage request queue 60 a new limit of three dispatches since the low priority queue 68 was afforded an opportunity to dispatch a task as described above. Upon completion of the requested prestaging of data, the completed request is removed from the low priority prestage request queue 68 and the task dispatched to execute that request is made available (block 454, FIG. 11) for another prestage request which has reached the front of a prestage request queue.

In this manner, for each task dispatched for the low priority prestage request queue 68, up to three tasks are dispatched for the medium priority prestage request queue 64 and up to ten tasks are dispatched for the high priority prestage request queue 60. It is appreciated that other dispatching limits, smaller or larger, may be employed, depending upon the particular application.

Figure 13:
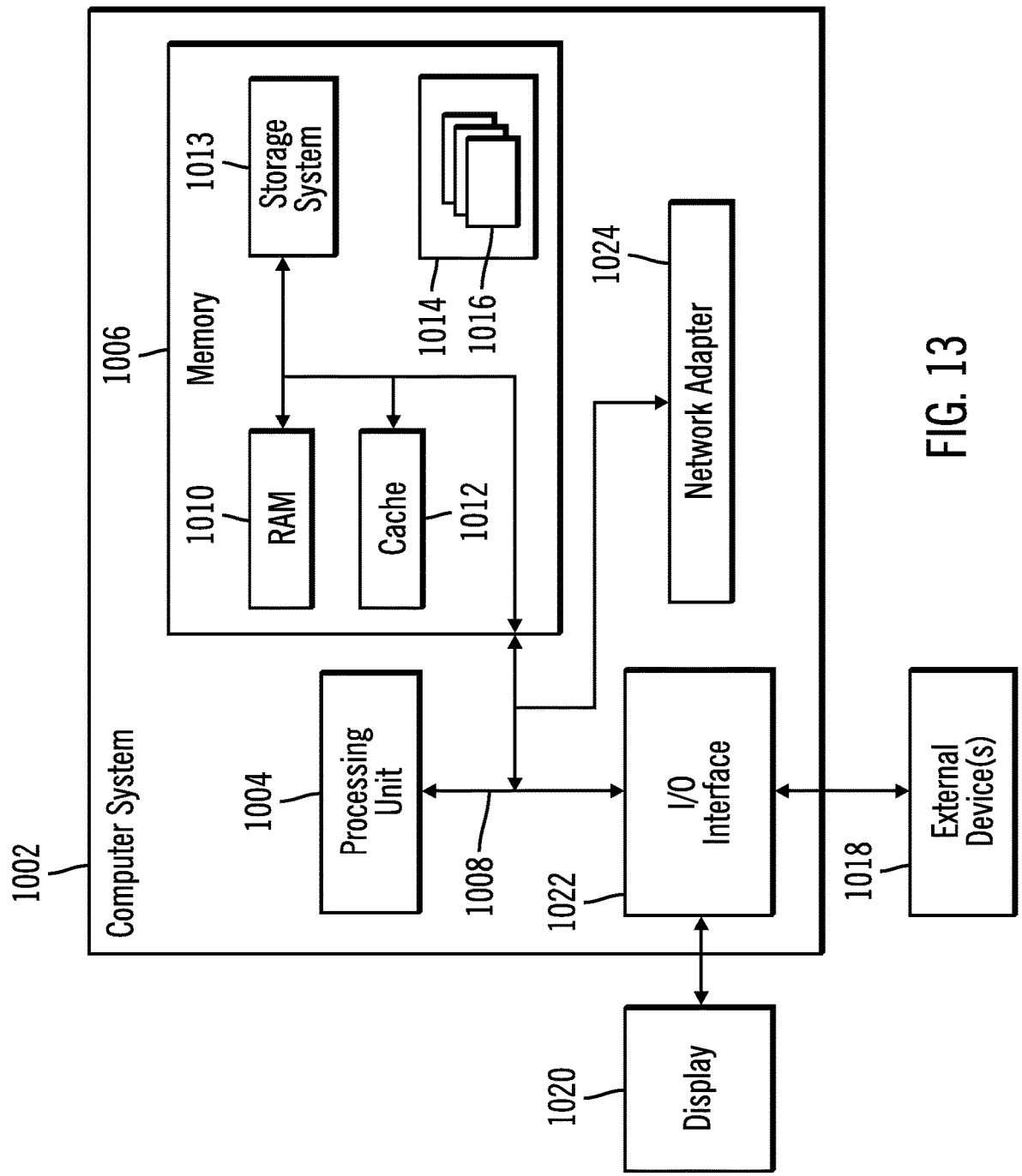
FIG. 13 illustrates a computer embodiment employing adaptive caching in a multi-tier cache in a data storage system in accordance with the present description.

The computational components of the figures may each be implemented in one or more computer systems, such as the computer system 1002 shown in FIG. 13. Computer system/server 1002 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1002 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 13, the computer system/server 1002 is shown in the form of a general-purpose computing device. The components of computer system/server 1002 may include, but are not limited to, one or more processors or processing units 1004, a system memory 1006, and a bus 1008 that couples various system components including system memory 1006 to processor 1004. Bus 1008 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1002 typically includes a variety of computer system readable media. Such media may be any available media that is accessible by computer system/server 1002, and it includes both volatile and non-volatile media, removable and non-removable media.

System memory 1006 can include computer system readable media in the form of volatile memory, such as random access memory (RAM) 1010 and/or cache memory 1012. Computer system/server 1002 may further include other removable/non-removable, volatile/non-volatile computer system storage media. By way of example only, storage system 1013 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1008 by one or more data media interfaces. As will be further depicted and described below, memory 1006 may include at least one program product having a set (e.g., at least one) of program modules that are configured to carry out the functions of embodiments of the invention.

Program/utility 1014, having a set (at least one) of program modules 1016, may be stored in memory 1006 by way of example, and not limitation, as well as an operating system, one or more application programs, other program modules, and program data. Each of the operating system, one or more application programs, other program modules, and program data or some combination thereof, may include an implementation of a networking environment. The components of the computer system 1002 may be implemented as program modules 1016 which generally carry out the functions and/or methodologies of embodiments of the invention as described herein. The system of FIG. 1 may be implemented in one or more computer systems 1002, where if they are implemented in multiple computer systems 1002, then the computer systems may communicate over a network.

Computer system/server 1002 may also communicate with one or more external devices 1018 such as a keyboard, a pointing device, a display 1020, etc.; one or more devices that enable a user to interact with computer system/server

1002; and/or any devices (e.g., network card, modem, etc.) that enable computer system/server 1002 to communicate with one or more other computing devices. Such communication can occur via Input/Output (I/O) interfaces 1022. Still yet, computer system/server 1002 can communicate with one or more networks such as a local area network (LAN), a general wide area network (WAN), and/or a public network (e.g., the Internet) via network adapter 1024. As depicted, network adapter 1024 communicates with the other components of computer system/server 1002 via bus 1008. It should be understood that although not shown, other hardware and/or software components could be used in conjunction with computer system/server 1002. Examples, include, but are not limited to: microcode, device drivers, redundant processing units, external disk drive arrays, RAID systems, tape drives, and data archival storage systems, etc.

The reference characters used herein, such as i, j, and n, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out processor operations in accordance with aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product configured for use with a computer system having a host, and a data storage system having storage, wherein the computer program product comprises a computer readable storage medium having program instructions embodied therewith, the program instructions executable by a processor of the computer system to cause computer system operations, the computer system operations comprising:

staging data from storage to a fast cache tier of a multi-tier cache in a non-adaptive sector caching mode in which data staged in response to a read request is limited to track sectors required to satisfy the read request; and staging data from storage to a slow cache tier of the multi-tier cache in a selected adaptive caching mode of a plurality of adaptive caching modes available for staging data of tracks wherein an adaptive caching mode of the plurality of adaptive caching modes is selected as a function of historical access to storage statistics.

2. The computer program product of claim 1 wherein the plurality of adaptive caching modes includes a sector adaptive caching mode in which data staged to the slow cache tier in response to a read request identifying at least one sector of a track, is limited in the sector adaptive caching mode to track sectors identified by the read request, a partial track adaptive caching mode in which data staged to the slow cache tier in response to a read request identifying sectors starting at an initial point of access of a track, is limited in the adaptive caching partial track mode, to a portion of a track beginning at the initial point of access of the track for the read request, to the end of track, and a full track adaptive caching mode in which data staged to the slow cache tier in response to a read request identifying sectors starting at an initial point of access of a track, is an entire track irrespective of the initial point of access of the track for the read request.

3. The computer program product of claim 2 wherein the computer system operations further comprise determining historical access ratios for a set of tracks and selecting for the set of tracks, an adaptive caching mode of the plurality of adaptive caching modes available for staging data of the set of tracks, as a function of historical access ratios determined for the set of tracks.

4. The computer program product of claim 3 wherein the computer system operations further comprise queuing prestage requests in one of a plurality of prestage request queues as a function of the selected adaptive caching mode and as a function of historical access ratios determined for the set of tracks.

5. The computer program product of claim 4 wherein the plurality of prestage request queues includes a first prestage request queue for queuing prestage requests having a first priority, a second prestage request queue for queuing prestage requests having a second priority lower than the first priority, and a third prestage request queue for queuing prestage requests having a third priority lower than the second priority.

6. The computer program product of claim 5 wherein the computer system operations further comprise allocating tasks for execution of prestage requests queued on the first, second and third prestage request queues as a function of available storage drive access bandwidth for prestaging tracks stored in the storage to the slow cache tier.

7. The computer program product of claim 6 wherein the computer system operations further comprise dispatching allocated tasks to execute prestage requests queued on selected prestage request queues of the first, second and third prestage request queues as a function of the first, second and third priority associated with first, second and third prestage request queues, respectively, wherein dispatching allocated tasks includes dispatching allocated tasks as a function of first, second and third limits associated with the first, second and third prestage request queues wherein the first limit associated with the first prestage request queue having the first priority is higher than the second limit associated with the second prestage request queue having the second priority and wherein the second limit associated with the second prestage request queue having the second priority is higher than the third limit associated with the third prestage request queue having the third priority.

8. A method, comprising:
staging data from storage to a fast cache tier of a multi-tier cache in a non-adaptive sector caching mode in which data staged in response to a read request is limited to track sectors required to satisfy the read request; and
staging data from storage to a slow cache tier of the multi-tier cache in a selected adaptive caching mode of a plurality of adaptive caching modes available for staging data of tracks wherein an adaptive caching mode of the plurality of adaptive caching modes is selected as a function of historical access to storage statistics.

9. The method of claim 8 wherein the plurality of adaptive caching modes includes a sector adaptive caching mode in which data staged to the slow cache tier in response to a read request identifying at least one sector of a track, is limited in the sector adaptive caching mode to track sectors identified by the read request, a partial track adaptive caching mode in which data staged to the slow cache tier in response to a read request identifying sectors starting at an initial point of access of a track, is limited in the adaptive caching partial track mode, to a portion of a track beginning at the initial point of access of the track for the read request, to the end of track, and a full track adaptive caching mode in which data staged to the slow cache tier in response to a read request identifying sectors starting at an initial point of access of a track, is an entire track irrespective of the initial point of access of the track for the read request.

10. The method of claim 9 further comprising determining historical access ratios for a set of tracks and selecting for the set of tracks, an adaptive caching mode of the plurality of adaptive caching modes available for staging data of the set of tracks, as a function of historical access ratios determined for the set of tracks.

11. The method of claim 10 further comprising queuing prestage requests in one of a plurality of prestage request queues as a function of the selected adaptive caching mode and as a function of historical access ratios determined for the set of tracks.

12. The method of claim 11 wherein the plurality of prestage request queues includes a first prestage request queue for queuing prestage requests having a first priority, a second prestage request queue for queuing prestage requests having a second priority lower than the first priority, and a third prestage request queue for queuing prestage requests having a third priority lower than the second priority.

13. The method of claim 12 further comprising allocating tasks for execution of prestage requests queued on the first, second and third prestage request queues as a function of available storage drive access bandwidth for prestaging tracks stored in the storage to the slow cache tier.

14. The method of claim 13 further comprising dispatching allocated tasks to execute prestage requests queued on selected prestage request queues of the first, second and third prestage request queues as a function of the first, second and third priority associated with first, second and third prestage request queues, respectively, wherein dispatching allocated tasks includes dispatching allocated tasks as a function of first, second and third limits associated with the first, second and third prestage request queues wherein the first limit associated with the first prestage request queue having the first priority is higher than the second limit associated with the second prestage request queue having the second priority and wherein the second limit associated with the second prestage request queue having the second priority is higher than the third limit associated with the third prestage request queue having the third priority.

15. A system, comprising:
a host;
a data storage system having storage storing data in tracks having sectors, a processor, and a multi-tier cache having a fast cache tier and a slow cache tier;
a computer program product comprising a computer readable storage medium having program instructions embodied therewith, the program instructions executable by a processor of the data storage system to cause computer system operations, the computer system operations comprising:
staging data from storage to the fast cache tier of the multi-tier cache in a non-adaptive sector caching mode in which data staged in response to a read request is limited to track sectors required to satisfy the read request; and
staging data from storage to a slow cache tier of the multi-tier cache in a selected adaptive caching mode of a plurality of adaptive caching modes available for staging data of tracks wherein an adaptive caching mode of the plurality of adaptive caching modes is selected as a function of historical access to storage statistics.

16. The system of claim 15 wherein the plurality of adaptive caching modes includes a sector adaptive caching mode in which data staged to the slow cache tier in response to a read request identifying at least one sector of a track, is limited in the sector adaptive caching mode to track sectors identified by the read request, a partial track adaptive caching mode in which data staged to the slow cache tier in response to a read request identifying sectors starting at an initial point of access of a track, is limited in the adaptive caching partial track mode, to a portion of a track beginning at the initial point of access of the track for the read request, to the end of track, and a full track adaptive caching mode in which data staged to the slow cache tier in response to a read request identifying sectors starting at an initial point of access of a track, is an entire track irrespective of the initial point of access of the track for the read request.

17. The system of claim 16 wherein the computer system operations further comprise determining historical access ratios for a set of tracks and selecting for the set of tracks, an adaptive caching mode of the plurality of adaptive caching modes available for staging data of the set of tracks, as a function of historical access ratios determined for the set of tracks.

18. The system of claim 17 wherein the computer system operations further comprise queuing prestage requests in one of a plurality of prestage request queues as a function of the selected adaptive caching mode and as a function of historical access ratios determined for the set of tracks.

19. The system of claim 18 wherein the plurality of prestage request queues includes a first prestage request queue for queuing prestage requests having a first priority, a second prestage request queue for queuing prestage requests having a second priority lower than the first priority, and a third prestage request queue for queuing prestage requests having a third priority lower than the second priority.

20. The system of claim 19 wherein the computer system operations further comprise allocating tasks for execution of prestage requests queued on the first, second and third prestage request queues as a function of available storage drive access bandwidth for prestaging tracks stored in the storage to the slow cache tier.

21. The system of claim 20 wherein the computer system operations further comprise dispatching allocated tasks to execute prestage requests queued on selected prestage request queues of the first, second and third prestage request queues as a function of the first, second and third priority associated with first, second and third prestage request queues, respectively, wherein dispatching allocated tasks includes dispatching allocated tasks as a function of first, second and third limits associated with the first, second and third prestage request queues wherein the first limit associated with the first prestage request queue having the first priority is higher than the second limit associated with the second prestage request queue having the second priority and wherein the second limit associated with the second prestage request queue having the second priority is higher than the third limit associated with the third prestage request queue having the third priority.

\* \* \* \* \*